US009235777B2

(12) United States Patent
Gu et al.

(10) Patent No.: US 9,235,777 B2
(45) Date of Patent: Jan. 12, 2016

(54) CODE CONVERSION DEVICE FOR IMAGE INFORMATION, A CODE CONVERSION METHOD FOR THE IMAGE INFORMATION, A SYSTEM FOR PROVIDING IMAGE RELATED INFORMATION USING AN IMAGE, AND A NON-TRANSITORY COMPUTER READABLE MEDIUM FOR THE IMAGE INFORMATION

(71) Applicant: APOLLO JAPAN CO., LTD., Yokohama-shi, Kanagawa (JP)

(72) Inventors: Zecang Gu, Yokohama (JP); Ikuko Kishigami, Yokohama (JP)

(73) Assignee: APOLLO JAPAN CO., LTD., Yokohama-shi, Kanagawa (JP)

(*) Notice: Subject to any disclaimer, the term of this patent is extended or adjusted under 35 U.S.C. 154(b) by 0 days.

(21) Appl. No.: 14/168,676

(22) Filed: Jan. 30, 2014

(65) Prior Publication Data
US 2015/0043814 A1 Feb. 12, 2015

(30) Foreign Application Priority Data

Aug. 12, 2013 (JP) ................................. 2013-176037
Jan. 24, 2014 (JP) ................................. 2014-011862

(51) Int. Cl.
*G06K 9/00* (2006.01)
*G06K 9/46* (2006.01)
(Continued)

(52) U.S. Cl.
CPC .......... *G06K 9/4652* (2013.01); *G06K 9/00671* (2013.01); *G06K 9/46* (2013.01); *G06K 9/481* (2013.01); *G06K 9/6202* (2013.01)

(58) Field of Classification Search
CPC ... G06K 9/4652; G06K 9/6202; G06K 9/481;
G06K 7/10; G06T 1/20; G09G 5/00; H04N 5/228; H04N 5/225
See application file for complete search history.

(56) References Cited

U.S. PATENT DOCUMENTS 5,586,197 A   12/1996  Tsujimura et al.
6,577,768 B1 *  6/2003  Ushida .......................... 382/238
(Continued)

FOREIGN PATENT DOCUMENTS

JP   H07-073195 A   3/1995
JP   2004-013306 A  1/2004
(Continued)

OTHER PUBLICATIONS

"AR Application description," [Online], [Search on Aug. 6, 2013], Internet <URL: www.ar.seikosha-p.com>.
(Continued)

*Primary Examiner* — Amir Alavi
(74) *Attorney, Agent, or Firm* — Manabu Kanesaka

(57) ABSTRACT

A code conversion device for image information for generating an image code which is unique to the image information from the image information, the code conversion device for image information includes a processor and a memory, wherein the memory contains instructions for causing the processor to perform operations of: converting acquired raw image information into a plurality of pieces of developed image information; extracting each piece of feature information, from each of the plurality of pieces of developed image information by performing a self-organization processing using a probability scale on each of the plurality of pieces of developed image information; and quantifying a plurality of pieces of feature information and generating an image code.

18 Claims, 7 Drawing Sheets

(51) Int. Cl.
*G06K 9/62* (2006.01)
*G06K 9/48* (2006.01)

(56) References Cited

U.S. PATENT DOCUMENTS

| | | |
|---|---|---|
| 6,981,644 B2 * | 1/2006 | Cheong et al. ........... 235/462.04 |
| 7,430,326 B2 | 9/2008 | Moroo et al. |
| 8,170,341 B2 | 5/2012 | Iwamoto et al. |
| 8,358,319 B2 * | 1/2013 | Cote et al. ..................... 345/611 |
| 2004/0042670 A1 | 3/2004 | Moroo et al. |
| 2006/0031684 A1 | 2/2006 | Sharma et al. |
| 2008/0137922 A1 * | 6/2008 | Catallo et al. ................ 382/128 |
| 2011/0280487 A1 | 11/2011 | Iwamoto et al. |
| 2012/0162460 A1 * | 6/2012 | Gray ......................... 348/222.1 |
| 2012/0229636 A1 * | 9/2012 | Ogawa et al. ................. 348/143 |
| 2015/0043814 A1 * | 2/2015 | Gu et al. ....................... 382/165 |

FOREIGN PATENT DOCUMENTS

| | | |
|---|---|---|
| JP | 2009-104164 A | 5/2009 |
| WO | 2010/084713 A1 | 7/2010 |

OTHER PUBLICATIONS

Japan Patent Office, "Notice of Reasons for Rejection for JP 2014-011862," Jul. 17, 2015.

* cited by examiner

FIG. 1A  FIG. 1B
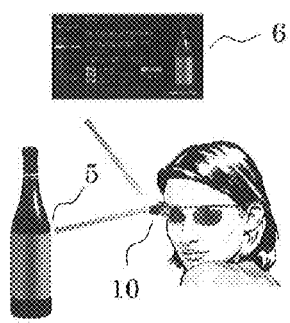
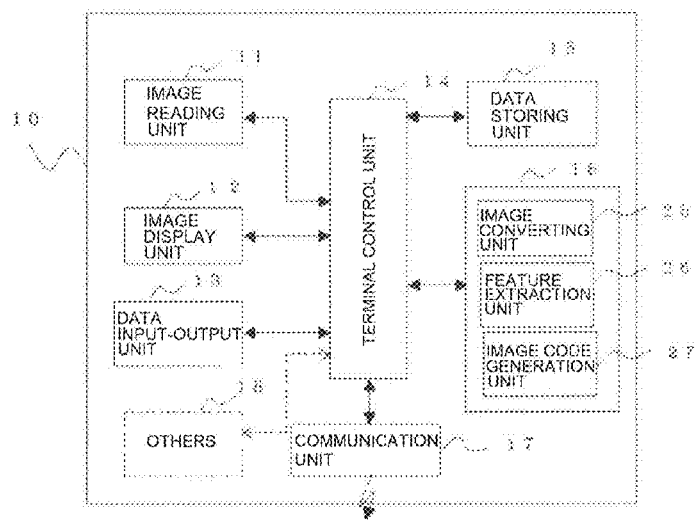
FIG. 2
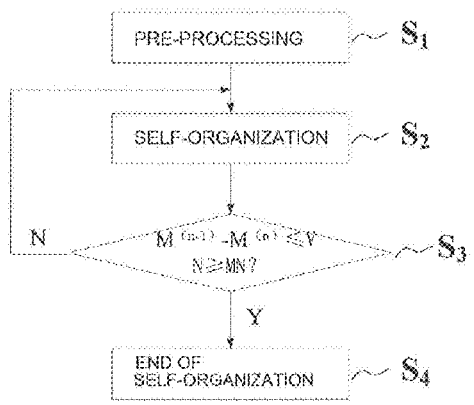

(a)    (b)

(a)  (b)

(a)  (b)

CODE CONVERSION DEVICE FOR IMAGE INFORMATION, A CODE CONVERSION METHOD FOR THE IMAGE INFORMATION, A SYSTEM FOR PROVIDING IMAGE RELATED INFORMATION USING AN IMAGE, AND A NON-TRANSITORY COMPUTER READABLE MEDIUM FOR THE IMAGE INFORMATION

RELATED APPLICATIONS

The present application is based on, and claims priority from, Japanese Application No. JP2013-176037 filed Aug. 12, 2013 and No. JP2014-011862 filed Jan. 24, 2014, the disclosure of which is hereby incorporated by reference herein in its entirety.

TECHNICAL FIELD

The present invention relates to the field of image processing technology, and to a code conversion device for image information capable of generating a characteristic image code for identifying the image from the image information read with a CCD camera or the like. In addition, the present invention relates to a code conversion method for the image information, a retrieval system using the image code utilizing the code conversion method, a code conversion program for the image information, and a recording medium in which the program is recorded. For example, by applying the present invention to GOOGLE GLASS ("GOOGLE GLASS" is a registered trademark of Google Inc., hereinafter the same shall apply in this specification) or the like, further enhancement and advancements of the AR technology (described later) are possible.

BACKGROUND ART

In recent years, a method of reading a two-dimensional code printed on a printed material or the like with a mobile phone and a smartphone etc, and downloading a video associated with the two-dimensional code, which has been read, has prevailed (Patent document 1).

However, printing the two-dimensional code on a printed material does not only impair a clear appearance of the printed material, but also requires space for printing the two-dimensional code. Therefore, from the viewpoint of emphasizing the clear appearance of the printed material, or from the viewpoint of efficient use of the printing space, "the smartphone reading system" has been developed using a digital watermarking technology which does not need to print a bar code and the like. As a representative technique of the same, there is a patent application titled "Fast signal detection and distributed computing in mobile computing devices" (Patent document 2).

On the other hand, as a technique for identifying an image using the image information, the AR (Augmented Reality) Technology has also been proposed (Non-patent document 1). In this technique, the image information is read using a smartphone and the like, and then the contour information specific to its image is extracted from the image information, and thus the image is identified. Based on the contour information specific to the image, image related information (hereinafter referred to as "related information") is searched over the network. The related information obtained by the search is then transmitted to the smartphone or the like with which the image was captured, and will be displayed along with the image information on the screen of the smartphone. In this technique the contour information is extracted by parsing the image information using an image recognition technology.

In addition, as a technology to facilitate the handling of such image information, a technology titled "Image encoding device and method, and its program" related to a method for direct coding of image information has also been proposed (Patent document 3).

PRIOR ART DOCUMENTS

Patent Documents

[Patent document 1]: Japanese Patent Application Publication No. 2009-104164
[Patent document 2]: Japanese Patent Application Publication No. 2011-234376
[Patent document 3]: Japanese Patent Application Publication No. 2004-94551
[Non-patent reference 1]: "AR Application description," [online], [search on Aug. 6, 2013], Internet <URL:www.ar.selkosha-p.com>

In the technology disclosed in Patent document 1, in addition to the need for a dedicated space to print the two-dimensional code, there is a problem that printing of the two-dimensional code impairs the appearance of the printed material itself.

In the smartphone reading system disclosed in Patent document 2, it is possible to embed the two-dimensional code in a product label so that the two-dimensional code is not visible on the outside. However, a special and complex printing process is necessary for embedding the two-dimensional code information so that it is not visible. Also, in addition to its printing cost and hassles, there is a problem that the code reading is only possible for a printing material which has a pre-embedded code in it.

On the other hand, in the AR technology disclosed in the non-patent document 1, the contour information for identifying an image is prepared as a document description by analyzing the contour of the image, and then an Internet search is carried out using this contour information, and thus the related information is obtained. However, in performing the Internet search using the document-described contour information, the contour information for identifying the image (the document description information) itself becomes relatively large data per image. Accordingly, just sending and receiving the document-described contour information for the Internet search makes the communication traffic load enormous. Further, since it is also necessary to store the data related to the image in association with the document description information, a storage device of large capacity is necessary as the database.

Further, it is also possible to guide users to false related information on the network by intentionally processing the contour form of an image to be similar to the contour of a false image. In addition, by putting an image copy of an authentic product label on fake products, it is possible to link the fake product with the information related to the authentic product.

In the retrieval system for identifying an image by only using the contour information in this manner, there is the problem that counterfeit prevention is difficult.

In Patent document 3, a technology for cording an image is disclosed. In this technology, the image is divided into a plurality of blocks. One of the blocks is then designated as a reference block. Thereafter, the mean value of the luminance of the pixels constituting the reference block and the mean values of the luminance of the pixels of each of other divided blocks are compared. The image is coded based on a magnitude relationship between the mean value of the reference block and the mean values of other divided blocks. Thus, Patent document 3 is intended to achieve coding by calculating the average value of the luminance of the pixels of the grayscale obtained from the divided blocks. However, since the mean value of the luminance of the divided blocks could be similar even for different images, when encoding an image by using only such mean values of luminance, it might be possible that different images generate the same codes.

Moreover, the analysis using gradations of the image in Patent document 3 is the evaluation by the threshold using the Euclidean distance in which the mean value of the pixels in each divided block is compared. With regard to the evaluation by the Euclidean distance, there is a risk of large variation of the gradations of a photographed image due to brightness of illumination when the image data was photographed, and due to differences in environmental luminance wavelength spectrums such as indoor and outdoor etc. Therefore, the technology of the prior art 3 has a problem in that the code conversion is not stable, so the technology cannot always give to an identical image the same code.

SUMMARY OF THE INVENTION

Problem to be Solved by the Invention

The present invention was carried out in light of the above-mentioned drawbacks, and provides:
a code conversion device for image information for stably generating the same code (an image code) which is unique to image information from the raw image information read by an image reading device,
a code conversion method for the image information,
a system providing image related information using the code converted from the image information a code conversion program for the image information, and
a recording medium in which the program is recorded.

Another object of the present invention involves providing a printing material such as a product label or a package or the like that is difficult to counterfeit by coding the image information into a unique image code, and a method for its preparation.

Means to Solve the Problem

The present invention was achieved in view of the problems of the prior art described above. The first embodiment of a code conversion device for image information according to the present invention pertains to a code conversion device for image information for generating an image code which is unique to the image information from the image information, the code conversion device for image information including:
an image conversion unit for converting acquired raw image information into a plurality of pieces of developed image information;
a feature extraction unit for extracting each piece of feature information from each of the plurality of pieces of the developed image information by performing a self-organization processing using a probability scale on each of the plurality of pieces of the developed image information; and
an image code generation unit for quantifying a plurality of pieces of the feature information extracted by the feature extraction unit and generating an image code.

This configuration achieves decomposing complex information constituting the raw image into mappings of a plurality of pieces of simple information. Using this configuration, the raw image information of complex systems can be classified into a plurality of pieces of developed image information. As combination of feature information extracted from each developed image, a large number of different codes can be generated. Therefore, with the combinations of this large number of the feature information, it becomes possible to identify a large variety of raw images with their unique image codes.

Other embodiment of the code conversion device for image information according to the present invention pertains to the code conversion device for image information, wherein the image conversion unit converts the distribution of gradation of each pixel of the raw image information into the developed image information based on geometrical or physical factors.

Other embodiment of the code conversion device for image information according to the present invention pertains to the code conversion device for image information, wherein the developed image information converted by the image conversion unit includes at least one of:
developed image information for each color where a gradation value of each pixel constituting the raw image information is resolved into a gradation value of a pixel of each color of RGB or CMYK,
power developed image information where the gradation value of each pixel is squared to convert into a physical power value,
edge developed image information obtained by gathering pixels of high gradation values where gradation values of adjacent pixels sharply change, or
developed image information indicating degree of similarity where difference between gradation values of corresponding pixels in the developed image information for each color is calculated, and the difference is used as the gradation value of the pixel.

Other embodiment of the code conversion device for image information according to the present invention pertains to the code conversion device for image information, wherein the feature extraction unit:
treats the probability scale of the self-organization processing as a parameter having probability attributes of probability distribution containing at least one of normal distribution, multivariate normal distribution, exponential distribution, Erlang distribution, Weibull distribution, triangular distribution, and beta distribution, and
sets a central value of the self-organization processing as a mean or an expected value of the probability distribution.

By using such a probability scale as the criterion for judgment in the process of extracting features of developed image information, it is possible to reduce the effect due to the differences in the luminance of the environment where a raw image is photographed or the effect from image noise on the extraction of the feature information. Accordingly, the stability of conversion from the raw image information into an image code can be enhanced.

Other embodiment of the code conversion device for image information according to the present invention pertains to the code conversion device for image information, wherein the feature extraction unit divides each of the plurality of pieces of developed image information into a plurality of regions and performs the self-organization processing for each of the divided regions using the probability scale so as to extract the feature information for each of the divided regions; and
wherein the image code generation unit quantifies the feature information of the divided regions, compares the quantified feature information with the quantified feature information of another divided regions, and generates the image code based on the magnitude of the comparison.

Other embodiment of the code conversion device for image information according to the present invention pertains to the code conversion device for image information, wherein the feature extraction unit performs the self-organization processing according to following equations:

$$A^{(n)}=A(G^{(n)})$$

$$M^{(n)}=M[G^{(n)},A(G^{(n)})]$$

$$G^{(n)}=G\{A(G^{(n-1)}),M[G^{(n-1)},A(G^{(n-1)})]\}$$

where $A(G)$ is a central value of a set $G \ni p_i$ ($i=1, 2, \ldots, m$) of a numerical sequence $p_1, p_2, \ldots, p_m$ of a given probability distribution,
$M[G, A(G)]$ is the probability scale of the central value $A(G)$, and
$G^{(n)} \ni p^{(n)}_i$ ($i=1, 2, \ldots, k$) is a set of numerical sequence $p^{(n)}_1, p^{(n)}_2, \ldots, p^{(n)}_k$ of the probability distribution of the k items existing within a radius $M[G^{(n-1)}, A(G^{(n-1)})]$ of a central value $A(G^{(n-1)})$ calculated by an (n−1)th self-organization processing.

Other embodiment of the code conversion device for image information according to the present invention pertains to the code conversion device for image information, wherein the feature extraction unit extracts the feature information of the developed image information from each of the plurality of pieces of developed image information by using a probability scale of a self-organization, and
wherein the image code generation unit uses a pre-formulated membership function for the feature information of each developed image information so as to quantify the feature information as information of a numerical value from 0 up to n, and generates the image code based on the numerical value.

By having such a configuration, for problems of a complex system such as coding of an image, fuzzy information of image features can be quantified by formulating membership functions, and therefore an image code can be directly generated.

Other embodiment of the code conversion device for image information according to the present invention pertains to the code conversion device for image information, the code conversion device for image information further comprising a feature vector storing unit which generates feature vectors of raw image with the plurality of pieces of the quantified feature information corresponding to the plurality of pieces of developed image information extracted by the feature extraction unit, and stores a plurality of the feature vectors with respect to each image as an image code of the raw image,
wherein the image code generation unit:
generates the feature vector of the raw image, which is the object of the code conversion, from the plurality of pieces of the quantified feature information extracted by the feature extraction unit at the time of the code conversion from the raw image information,
compares the generated feature vector of the raw image with the feature vectors registered in the feature vector storing unit, and
set the feature vector with the closest Euclidean distance among the registered feature vectors as the image code of the raw image which is the object of the code conversion.

Other embodiment of the code conversion device for image information according to the present invention pertains to the code conversion device for image information, wherein the image code generation unit, at the time of registering the feature vectors:
converts each of a plurality of pieces of raw image information of the same raw image, which are obtained by photographing the same image multiple times under different photographing conditions, into each piece of developed image information,
extracts each piece of feature information from the plurality of the developed images,
generates a plurality of feature vectors for the same image,
performs the self-organizing processing, based on a predetermined probability scale, on the plurality of the feature vectors for the same image,
calculates a central value and a probability scale of each piece of the feature information of the feature vectors, and
registers the central value and the probability scale of the plurality of the feature information as an image code including the feature vector, and
wherein the image code generation unit compares the central value of the feature information vector extracted from the raw image, which is the object of code conversion, with the central values of the registered feature vectors, and
set the feature vector having the central value with the closest distance of the probability scale as the image code of the raw image information that is the object of the code conversion.

By using a plurality of pieces of raw image information from the same reading image that were acquired under different photographing environments, and setting the central value of the feature information and the a probability scale as a feature vector, it is possible to identify the image code more accurately.

That is, by performing the self-organization processing using the probability scale on a plurality of pieces of image information which were photographed under the different environments, the calculated result of the central value of the feature information will be the central value of the highest probability relative to the probability distribution of the plurality of pieces of the raw image information from the same reading image. Thus, the image code can be generated accurately.

The first embodiment of A code conversion method for image information according to the present invention pertains to a code conversion method for image information for generating an image code which is unique to the image information from the image information, the code conversion method comprising:
an image conversion step for converting acquired raw image information into a plurality of pieces of developed image information;
a feature extraction step for quantifying and extracting feature information from each of the plurality of pieces of developed image information by performing a self-organization processing using a probability scale on each of the plurality of pieces of developed image information; and
an image code generation step for generating an image code including a digital code based on the plurality of pieces of quantified feature information extracted by the feature extraction step.

Other embodiment of a code conversion method for image information according to the present invention pertains to the code conversion method for image information, wherein the image conversion step includes any of the following:

a conversion into developed image information for each color where a gradation value of each pixel of the raw image information is resolved into a gradation value of a pixel of each color of RGB or CMYK, a conversion into power developed image information where the gradation value of each pixel is squared to convert into a physical power value, a conversion into edge developed image information obtained by gathering pixels of high gradation values where gradation values of adjacent pixels sharply change, or a conversion into developed image information indicating degree of similarity where difference between gradation values of corresponding pixels in the developed image information for each color is calculated, and the difference is used as the gradation value of the pixel.

Other embodiment of a code conversion method for image information according to the present invention pertains to the code conversion method for image information, wherein the feature extraction step:

treats the probability scale of the self-organization as a parameter having probability attributes of probability distribution containing at least one of normal distribution, multivariate normal distribution, exponential distribution, Erlang distribution, Weibull distribution, triangular distribution, and beta distribution, and sets a central value of the self-organization processing as a mean or an expected value of the probability distribution.

Other embodiment of a code conversion method for image information according to the present invention pertains to the code conversion method for image information, wherein the feature extraction step divides each of the plurality of pieces of the developed image information into a plurality of regions and performs the self-organization processing for each of the divided regions using the probability scale so as to extract the feature information for each of the divided regions, and wherein the image code generation step, using one of the divided regions as a reference region, quantifies the feature information of the reference region, compares the quantified feature information with the quantified feature information of the other divided regions, and generates the image code.

Other embodiment of a code conversion method for image information according to the present invention pertains to the code conversion method for image information, wherein the feature extraction step extracts the feature information of the developed image from each piece of the developed image information by using a probability scale of a self-organization, and wherein the image code generation step uses a plurality of pre-formulated membership functions for feature information of all the developed images so as to quantify the feature information as information of a numerical value from 0 up to n, and directly generates the image code.

Other embodiment of a code conversion method for image information according to the present invention pertains to the code conversion method for image information according to any one of claims 10 through 14, the code conversion method further comprising a feature vector registering step for quantifying, with regard to a predetermined image, the feature information which is extracted in the feature extraction step and is extracted from the plurality of the developed image information, generating a feature vector for each predetermined raw image, and preliminarily registering the feature vector as an image code of the predetermined raw image in a feature vector registering unit, wherein the image code generation step further comprises the steps for:

quantifying a plurality of pieces of the feature information extracted in the feature extraction step, generating the feature vector of the raw image, which is the object of the code conversion, from the quantified feature information, comparing the generated feature vector with the feature vectors registered in the registering unit, and judging the feature vector with the closest Euclidean distance among the registered feature vectors as the image code of the raw image which is the object of the code conversion.

Other embodiment of a code conversion method for image information according to the present invention pertains to the code conversion method for image information, wherein the feature vector registering step further comprises the steps for:

converting each of a plurality of pieces of raw image information of the same raw image, which are obtained by photographing the same image multiple times under different photographing conditions, into each piece of developed image information, extracting each piece of feature information from the plurality of the developed images, and generating a plurality of feature vectors for the same image, a step for performing the self-organizing processing, based on a predetermined probability scale, on the plurality of the feature vectors of the same image, calculating a central value and a probability scale of each piece of the feature information of the feature vectors, and registering the central value and the probability scale of the plurality of the feature information as an image code including the feature vector, and wherein the image code generation step further comprises the steps for:

comparing the central value of the feature information vector extracted from the raw image, which is the object of code conversion, with the central values of the registered feature vectors, and judging the central value of the feature vector with the closest distance of the probability scale as the image code of the raw image information that is the object of the code conversion.

The first embodiment of a system for providing image related information using an image code according to the present invention pertains to a system for providing image related information using an image code, the system comprising a data terminal device connectable to a network and a server storing a plurality of pieces of related information related to an image, wherein the terminal device comprises the code conversion device for image information according to anyone of claims 1 through 9, an image reading unit, an image display unit, a data storage unit, a communication unit, a data input-output unit and a control unit for controlling various units, wherein the server stores the plurality of pieces of related information related to the image associated with the image code that is converted by the conversion device for the image information, and wherein the server transmits the related information corresponding to the image code, in response to a request from the terminal device, to the terminal device which made the request.

The first embodiment of a code conversion program for image information according to the present invention pertains to a code conversion program for image information for converting image information into a unique image code by letting a computer execute:

an image conversion step for converting acquired raw image information into a plurality of pieces of developed image information;

a feature extraction step for extracting feature information from each of the plurality of pieces of developed image information by performing a self-organization processing using a probability scale on each of the plurality of pieces of developed image information; and an image code generation step for quantifying the feature information extracted in the feature extraction step and generating an image code including a digital code based on the plurality of pieces of quantified feature information.

The first embodiment of a recording medium where the code conversion program for image information according to the present invention pertains to a recording medium where the code conversion program for image information according to the first embodiment of the code conversion program for image information aforementioned above is recorded.

Effect of the Invention

According to the code conversion device for image information and its method of the present invention, since the code conversion device can convert image information read by an image reading device into a unique code, it is possible to convert any image in the world into an individual unique code (image code). Since the image code is much shorter than document description information, it can be much easier to store all kinds of related information which relates to the image in association with the image code. In addition, since image information can be converted into an image code by just reading the image with the image acquisition device of the present invention, it becomes possible to retrieve the information relating to the image by using the short image code. Therefore, according to the present invention, it is possible to speedup searches of the image related information, lower communication load, and decrease the storage capacity for the related data.

For example, a unique image code for each image can be obtained quickly and easily by reading printed materials such as product labels or product packaging or the like, landscape, and other images, and then performing the coding treatment with the coding device for the image and its method according to the present invention.

With this, by preliminarily registering information related to each type of image (related information: data, video or still image) in association with an image code corresponding to each image, it is possible to quickly retrieve the information related to the image read with the image reading device.

That is, according to the present invention, for example, with just image information of printed materials such as product labels or product packaging, etc., a unique image code corresponding to the image can be generated. Thus, without adding an add-on code like two-dimensional codes that impairs the printed material or embedding a secret code beforehand in printed materials or the like, it becomes possible to generate an image code which can detect its image only using with the image information.

For example, product labels or packages of exhibited products are read with the image reading device, and the images of the labels or packages are converted into image codes. By registering various types of data such as the product's growing district, the history, the regular selling price and the like as related information in the database together with this image code, it becomes possible to obtain the unique information for the product such as its growing district and the history and the like from the image code of the image read by the image reading device.

By using the code conversion device for image information or the code conversion method of the present invention, it is possible to quickly and easily convert acquired raw image information into an image code. It becomes possible to provide a faster retrieval system for information related to the image or a system providing additional information with using Google Glass, smartphones or cell-phones or the like. With this, the related information associated with an image code can be instantly retrieved on the Internet by using the image code converted by a mobile terminal. In addition, according to the present invention, since the code conversion of images can be accomplished relatively easily, it is possible to distribute the code conversion processing function to each mobile terminal, and the image retrieval process can be easily performed without applying load of the code conversion to the server. That is, since image information can be instantly converted into a short image code at the site of the image taken, the communication load associated with the search can be reduced, and thus Internet search efficiency can be enhanced.

Further, in the case that an image is identified by the contour information, there will be more erroneous recognitions when the images have a simple contour. On the other hand, the present invention performs the code conversion of the image information based on features of various other constituent elements as well as color information of the image. The present invention has an effect in that the feature resolution efficiency for identifying an image is higher.

According to the image conversion method of the present invention, an image code is generated by converting raw image information into developed image information. Therefore, a printed image that is difficult to counterfeit can be provided by combining the developed image information such that reproducing of the raw image with scanners, copy machines and the like is not possible. Thus, the present invention can provide a printed image which can be converted into a unique code. The printed image is difficult to counterfeit so that it can be used for product labels or packages and the like.

BRIEF DESCRIPTION OF DRAWINGS

FIG. 1A is a diagram for explaining the image code conversion method and the conversion device of the present invention.

FIG. 1B is a functional block diagram exemplifying the mobile terminal device 10 incorporating a code conversion device for image information according to the present invention.

FIG. 2 is a flow chart showing the flow of the self-organization process.

FIG. 11 shows the flow of a system providing related information of an image focusing on products and the like.

FIG. 12 shows the flow of a system providing related information of an image focusing on labels and the like.

DESCRIPTION OF THE EMBODIMENTS

Figure 3:
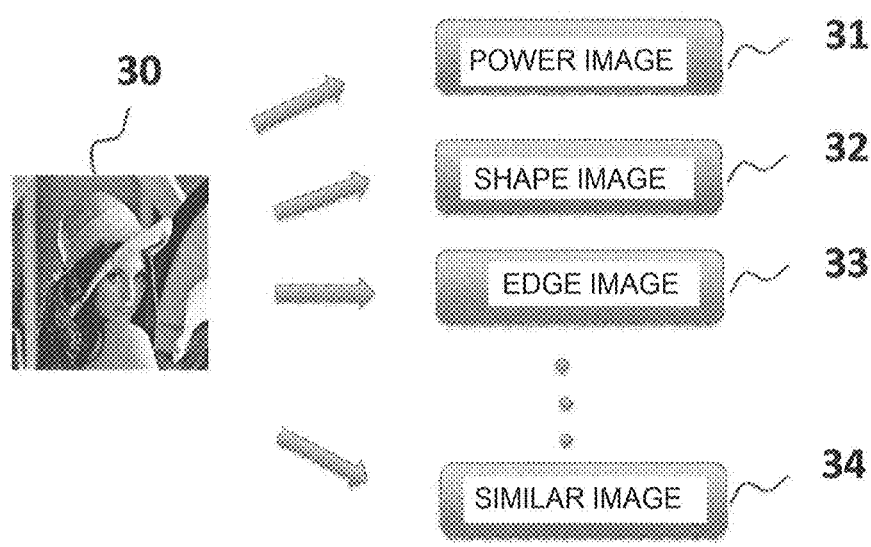
FIG. 3 is a conceptual diagram showing the converted image of a geometrical or physical image.

The embodiments of the present invention are described below with reference to drawings.

FIG. 1A is a diagram for explaining a code conversion device for image information according to the present invention. FIG. 1A presents one example in which Google Glass is used as a mobile terminal device.

The present invention is not limited to Google Glass, and can be also employed in systems based on smartphones, mobile phones, the other mobile terminal devices, online terminals connected to phone lines, leased lines, surveillance cameras, authentication cameras at various gates such as ticket barriers, and credit card terminals and the like.

Explanation is offered below with reference to FIG. 1A and FIG. 1B. FIG. 1A is an image diagram showing the state of reading an image of a product label 6 or package attached to a product 5 by using a mobile terminal device 10 such as Google Glass 7 or the like. FIG. 1B is a functional block diagram exemplifying the mobile terminal device 10 incorporating a code conversion device for image information according to the present invention. In this functional block diagram, the desirable feature elements for applying the present invention to the mobile terminal 10 are shown by solid line blocks. This is not intended to limit the scope of the present invention to this configuration. Deleting part of this configuration, or adding other configurations are also included in the scope of the present invention. As needed, as shown in dotted line blocks, GPS and other various types of sensors 18 may also be provided.

The mobile terminal device 10 includes an image reading unit 11 configured from a device which acquires image information such as CCD or the like, an image display unit 12, a data input-output unit 13, a data storing unit 15, an image coding processing unit 16, and a communication unit 17. All of these units are controlled by a terminal control unit 14.

By directing the image reading unit of the mobile terminal device 10 at the product label 103 and the like, the image reading unit 11 can acquire the image information. In the present disclosure, the image information which is "the object for the image code conversion" acquired by the mobile terminal device 10 and the like, is referred to as "raw image information."

The acquired raw image information is sent to the terminal control unit 14, and is displayed on the image display unit 12. At the same time, the raw image information is stored in the data storing unit 15. The terminal control unit 14, in combination with the image coding processing unit 16, generates a unique "image code" for the image from the acquired raw image information. Under the control of the terminal control unit 14, the generated unique image code is stored in the data storing unit 15.

The image code is then transmitted to a server connected to an external network or a computer system along with predetermined command information via the communication unit 17. After the server or the computer system receives the image code, it reads related information stored in association with the image code, and transmits the related information to the mobile terminal 10.

The mobile terminal device 10 which receives the related information from the server or the like displays the received related information along with the information acquired by the image reading unit on the image display unit 12. The related information may be processed in the terminal 10 before displayed.

As a device to which the present invention is applied, a mobile terminal device 10 such as Google Glass is illustrated in FIG. 1A and FIG. 1B. However, the code conversion device for image information according to the present invention is not limited to be provided in a mobile terminal device, and may also be provided in a computer connected to the line, POS terminal devices, or other dedicated search terminal. In addition, the image coding processing unit 16 shown in the block diagram of FIG. 1B can also be provided in a server connected to the network or a computer system instead of a mobile terminal.

<Generation of Image Code>

The conversion from raw image information to an image code is explained below.

The image code is converted by the following steps:

First, the acquired "image information" is converted into a plurality of pieces of "developed image information." Each piece of the developed image information is subjected to a self-organization processing and "feature information" is extracted. By quantifying the unique feature information extracted from the developed image information and combining the feature information, the image code which is unique to the image is generated.

In the mobile terminal device 10 of FIG. 1B, these processes are performed mainly by the terminal control unit 14 and the image coding processing unit 16. That is, the image coding processing unit 16, in combination with the terminal control unit 14, converts raw image information into a unique code (image code) specific to the image.

The terminal control unit 14 consists of a CPU and various types of registers and the like. Based on the control program or data which have been previously stored, the terminal control unit 14 controls various units following input-output information or various types of control commands.

The image coding processing unit 16 is provided with an image converting unit 25, a feature extraction unit 26, and an image code generation unit 27.

The image conversion unit 25 converts raw image information which was acquired from the image reading device into a plurality of pieces of "developed image information", and outputs the developed image information to the feature extraction unit 26.

On the basis of a probability scale of the self-organization processing, the feature extraction unit 26 extracts feature information from each piece of the developed image information. It is also possible to extract many different types of feature information from a single developed image.

The image code generation unit 27 generates a digitalized image code by quantifying the extracted feature information and combining the feature information. The terminal control unit 14 retrieves the information related to the obtained raw image using the generated image code via a communication unit 17.

"Conversion to the developed image information" and "Self-organization processing" will be explained in detail later.

In the embodiment of FIG. 1B, the configuration integrating a partial function of the terminal control unit 14, the image coding processing unit 16, and the data storing unit 15 and the like constitutes the "code conversion device for image information" of the present invention. The image coding processing unit 16 can also function as the "code conversion device for image information" of the present invention by having a CPU, a memory, and other necessary functions in it.

<Conversion to Developed Image Information>

The code conversion device for image information or the code conversion method according to the present invention converts a raw image which is the object for the code conversion into a geometrical or physical developed image, and then converts the developed image information into an image code. The code conversion device for image information or the code conversion method according to the present invention does not directly extract feature information from the raw image information which is the object for the code conversion.

The raw image information is converted by the image conversion unit 25 into a plurality of pieces of "developed image information."

FIG. 3 is a diagram conceptually showing one example where raw image information is converted into a plurality of pieces of developed images. As shown in FIG. 3, in the present invention, instead of directly extracting characteristic components from a raw image 30, the raw image 30 is converted based on a geometrical or physical model into developed image information such as a power image 31, a shape image 32, an edge image 33, and a similar image 34 or the like, and then the feature information is extracted from the developed image information. Those skilled in the art can optionally choose the type of the developed image based on the technical knowledge. For example, it is also possible to convert the raw image information into a variety of developed images such as entropy images and frequency images and the like.

Here, the geometrical developed image refers to the extraction of geometrical features of the raw image, such as for example, an edge developed image where the geometrical edge features of the raw image have been extracted. It is also possible to convert the raw image into a developed image having the feature of geometrical shapes, the feature of positions, the feature of directional elements, and the feature of the size.

The physical developed image is, for example, a developed image where gradation values (usually 0-255) of the luminance of the raw image as described above are treated as a parameter expressing, for example, a weight or mechanical numerical value. Thus, it is possible to convert the raw image information into the developed image information from the various types of views such as the feature where the gradation values of luminance are treated as a physical power, the feature of the shape of edges, the feature of similarity, the feature of entropy, the feature where the gradation values of luminance are treated as a center of gravity, the mechanical feature, the frequency feature, and the like.

For example, a plurality of developed images can be extracted from gradation values of the luminance of a raw image. As an example, by simply converting R/G/B obtained from the raw image into C, M, Y, and K, it is possible to generate the developed image information of four types of luminance C, M, Y, and K. It is also possible to generate additional six pieces of developed image information by calculating the differences in the luminance between the pixels corresponding to each image of C, M, Y, and K. By taking the square of the gradation value as a power value, it is also possible to create four developed images of the power values of C, M, Y, and K. Thus, it is possible to create many types of developed images from the raw image.

Moreover, FIG. 3 shows the developed image as an image. In the actual processing, there is no need to batch convert the entire developed image information as an image. While each pixel or the pixel data in a certain definite range of the raw image information is converted sequentially into the developed image information (data), a self-organization processing explained below may perform.

<Self-Organization Processing>

The "self-organization processing" will be explained below.

The self-organization processing is an autonomic process where an ordered state in a disordered system is formed without external control. Here, "without external control" means that there is no external interaction which can direct or control the process from outside to make patterns.

As a brief explanation in conformance with the present invention, the developed image information is sorted by selecting each target element (pixel) for comparison based on a predetermined scale (distance). That is, without external control, the target element for comparison is autonomically chosen based on closeness to the standardized scale, and the features are concentrated.

In conventional technique, a distance scale (Euclidean scale) is used as this scale. However, the present invention has one of its characters in selecting pixels based on the "proximity" using "probability scale" rather than the distance scale (Euclidean scale). By repeating the self-organizing processing for each developed image, it becomes possible to extract the feature portion of each piece of the developed image information. Further, by using the "probability scale", the extraction of the feature portion is insulated from the influence of the environmental differences where images are taken. That is, even if identical images are acquired under the different environments having different luminance, there is an enhanced possibility to convert the identical images into the same image code.

The general equation of the self-organization processing is defined as $$A^{(n)} = A(G^{(n)})$$

$$M^{(n)} = M[G^{(n)}, A(G^{(n)})]$$

$$G^{(n)} = G\{A(G^{(n-1)}), M[G^{(n-1)}, A(G^{(n-1)})]\}$$

where $A(G)$ is a central value of a set $G \ni p_i$ ($i=1, 2, \ldots, m$) of a numerical sequence $p_1, p_2, \ldots, p_m$ of a given probability distribution, $M[G, A(G)]$ is the probability scale of the central value $A(G)$, and $G^{(n)} \ni p^{(n)}_i$ ($i=1, 2, \ldots, k$) is a set of a numerical sequence $p^{(n)}_1, p^{(n)}_2, \ldots, p^{(n)}_k$ of the probability distribution of the k items existing within a radius $M[G^{(n-1)}, A(G^{(n-1)})]$ of a central value $A(G^{(n-1)})$ calculated by the $(n-1)$th self-organization processing.

FIG. 2 is the flow chart showing the self-organization process. As shown in FIG. 2, the self-organization algorithm is composed of four steps as follows.

Step $S_1$:

This step ($S_1$) is a step intended for pre-processing.

Here, a method for calculating area where the density of the gradation of image information is the highest with using the self-organization processing will be shown as a first illustration, and the algorithm of the self-organization of the present invention will be explained.

The initial probability scale $M^{(0)}$, the initial central value $(x_0, y_0)^{(0)}$ of the object to be treated, the convergence value V of the self-organization processing, and the maximum value of the number of repetitions MN of the self-organization processing, used in the first self element-forming processing, are set beforehand. The self-organization processing is performed repeatedly until the convergence value V or the maximum iteration count MN is reached.

Here, the initial probability scale $M^{(0)}$ is the initial condition, and is the probability range which is obtained by the calculation of the self-organization processing of image information. In the first self-organization processing, the pixels in this probability range are selected, and the other pixels are discarded. The initial central value of the self-organization processing $(x_0, y_0)^{(0)}$ is also the initially applied condition, and is the central part of the calculation range of the self-organization processing of the image information. The first calculation of the self-organization processing of the present invention is processed based on the initial probability scale $M^{(0)}$ and the initial central value $(x_0, y_0)^{(0)}$. The first self-organization processing calculates the probability scale and the central value for the next self-organization processing, and based on these scale and central value, the next self-organization processing is executed. In this way, by repeating the calculation of the self-organization processing without external control, the area where the density of gradation of the image is the highest (final central value) and the range (final probability scale) are calculated.

It is possible to arbitrarily set the initial probability scale $M^{(0)}$ and the initial central value of the self-organization processing $(x_0, y_0)^{(0)}$ of the self-organization processing. However, it is preferable to set these values so that the central value $(x_n, y_n)^{(n)}$ that is determined ultimately by the (n)th self-organization processing is included within the range of the initial probability scale $M^{(0)}$.

If the initial probability scale $M^{(0)}$ is too large, the calculation of the self-organization processing will take too much time. If the initial probability scale $M^{(0)}$ is too small, an accurate result cannot be obtained. The index (n) represents the number of repetitions of the self-organization processing.

As the initial probability scale, for example, it is possible to use dispersion value and the like of the gradation value of the luminance of each pixel. Further, as the convergence value V, for example, it is possible to set the difference between the (n−1)th dispersion value $S^2_{(n-1)}$ and the (n)th dispersion value $S^2_{(n)}$, namely, $S^2_{(n-1)} - S^2_{(n)}$, equal to $V_{(n)}$. These probability scale and convergence value are illustrative, and it is also possible to use other parameters as a probability scale and convergence value as described below.

It is also possible to arbitrarily set the convergence value V of the self-organization processing. However, it is impossible to calculate accurate results if the convergence value V is too large. Also, if the convergence value V is too small, it takes too much time for calculating the self-organization processing.

The maximum number of repetitions MN of the self-organization processing is preferably set generally in the range of about 2-10 times. To ensure a constant processing speed while aiming the increased accuracy, it is preferable to set the number of repetitions in the range of about 3-6 times.

Step $S_2$:

Step $S_2$ is a step intended for calculation of the self-organization processing. The step $S_2$ is executed repeatedly until the self-organization processing reaches the convergence value V or the maximum number of repetitions MN.

In the (n)th self-organization processing, setting the central value $(x_0, y_0)^{(n-1)}$ calculated in the previous (n−1)th self-organization processing as the central value, and the probability scale $M^{(n-1)}$ as the radius, the dispersion value $S^{(n)}$ of gradation density of all pixels $I(x_i, y_j)$ (i=1, 2, ... k, j=1, 2, ... l) within the radius $M^{(n)}$ will be determined. Then $M^{(n)}$ is set to be $(S^{(n)})^2$ ($M^{(n)}=(S^{(n)})^2$ is updated), and (n) is replaced with (n+1) ((n)=(n+1) is updated.)

Equation 1 is an example for calculating the central value in the (n)th self-organization processing.

$$X_0^{(n)} = X_0^{(n-1)} + \frac{\sum_{j=1}^{l}\sum_{i=1}^{k}(x_i - X_0^{(n-1)})I(x_i, y_j)}{\sum_{j=1}^{l}\sum_{i=1}^{k} I(x_i, y_j)}$$ [Equation 1]

$$Y_0^{(n)} = Y_0^{(n-1)} + \frac{\sum_{j=1}^{l}\sum_{i=1}^{k}(y_i - Y_0^{(n-1)})I(x_i, y_j)}{\sum_{j=1}^{l}\sum_{i=1}^{k} I(x_i, y_j)}$$

The Equation 2 shown below is used for calculating "dispersion value" of image information in the case when the scale for measuring the range where the gradation density of the image information is the highest is set as the "dispersion value" of the image.

In Equation 2, for taking into account the weight of each element $(x_i, y_j)$, Equation 2 is multiplied by $I(x_i, y_j)$, and the mean value is calculated. For example, if the gradation of each color of each pixel is represented by 0-255, and the gradation of a given pixel $(x_i, y_j)$ is 150, then it is possible to assign the weight with using $I(x_i, y_j)=150$.

$$(S^{(n)})^2 = \frac{\sum_{j=1}^{l}\sum_{i=1}^{k}[(x_i - X_0^{(n)})^2 + (y_j - Y_0^{(n)})^2]I(x_i, y_j)}{\sum_{j=1}^{l}\sum_{i=1}^{k} I(x_i, y_j)}$$ [Equation 2]

Here, $x_0^{(n-1)}, y_0^{(n-1)}$ is considered as the central value of the self-organization of the pre-processed image $I(x_i, y_j)$ (i=1, 2, ..., k, j=1, 2, ..., l).

Step $S_3$:

Step $S_3$ is the step for checking whether the self-organization processing should be finished or not. the check is made as to whether the number of repetitions of the self-organization processing has reached its maximum (N≥MN) value or the self-organization processing has converged ($M^{(n-1)} - M^{(n)} \leq V$). If either of above-mentioned conditions becomes true (YES), the process will advance to the next Step ($S_4$) for completion of the self-organization processing. On the other hand, if neither of the above-mentioned conditions becomes true (NO), the process will return to Step 2 and the same process will be repeated.

Step $S_4$:

If Step $S_3$ judges that the maximum repetition number MN or the predetermined convergence value V has been reached, the self-organization processing will end.

For example, the $X_0^{(n)}, Y_0^{(n)}$ of Equation 1 can be considered to be a geometrical center such as a coordinate center, or a physical center such as a mechanical mass point, or a mathematical center such as a median value of numerical values.

As an example, in the case of the mechanical mass point, if gradation value of each pixel of the image information is considered as a mechanical mass point having different size of forces, the value $X_0^{(n)}, Y_0^{(n)}$ of Equation 1 calculated by the self-organization processing described above will be the area with the best mechanical balance.

Looking further in terms of probability, the $X_0^{(n)}, Y_0^{(n)}$ may be, for example, considered as a stochastic center such as a probability average, or expected probability.

In the above description, although an example of employing the dispersion value of normal distribution as the probability scale $M^{(n)}$ of the self-organization processing was illustrated, the present invention is not limited to this example only. As a probability scale, it is also possible to arbitrarily set parameters having probability attributes such as the normal distribution, the multivariate normal distribution, the t distribution, the exponential distribution, the Erlang distribution, the Weibull distribution, the triangular distribution, the beta distribution or the like.

Another application with the self-organization processing of the present invention is a method for calculating the median among the numerical values with more than or equal to 70% probability for random data. For example, let $x_1, x_2, \ldots, x_k$ be histogram data in the X direction of the image information, and let a mean value of $x_1, x_2, \ldots, x_k$ be the central value of the self-organization processing. In this case, the mean value X is expressed by Equation 3.

$$X = \frac{1}{k}\sum_{i=1}^{k} x_i \qquad \text{[Equation 3]}$$

When the probability scale of the self-organization processing is considered as the dispersion value of $x_1, x_2, \ldots, x_k$ of the histogram data in the x direction of the image, the variance of the one-dimensional distribution $S^2$ is expressed by Equation 4.

$$S^2 = \frac{1}{k-1}\sum_{i=1}^{k}(x_i - X)^2 \qquad \text{[Equation 4]}$$

For example, by using Equation 3, Equation 4 and the self-organization processing algorithm described above, it is possible to calculate the median among the numerical values having more than or equal to 70% probability for the histogram data.

Figure 4:
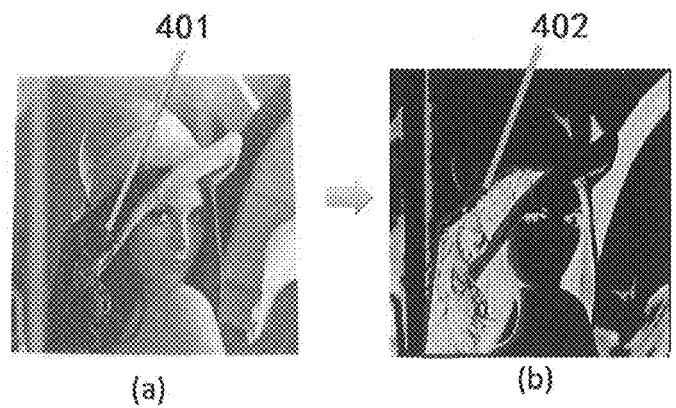
FIG. 4 shows one example of extraction of an image feature by conversion to a power image.

FIG. 4 is a diagram demonstrating a squared developed image (power image) obtained by inverting the gradation values of various pixels of a raw image and squaring them.

A photo (b) in FIG. 4 shows the raw image for which the image code is to be generated. A photo (b) in FIG. 4 shows a developed image (power image) obtained by inverting and power-converting the gradation of the pixels. The 401 in FIG. 4 shows the range where the power is the highest (the darkest region).

As explained above, based on the differences in brightness of the environments where an image was taken, the luminance of each pixel of the acquired image information markedly varies.

Since the luminance is squared in the power image, this change is further pronounced. Therefore, since the degree of power markedly varies with the differences in brightness of the photographing environments, if self-organization processing of the image information is done using the conventional threshold value of the Euclidean distance, the generated image code value will vary due to the difference in brightness of the photographing environments, and will lack stability.

For such power images, by calculating using the probability scale on the basis of the algorithm of the self-organization processing shown in FIG. 2, it is possible to improve the above-described problem caused by the difference in the brightness of the photographing environments. Even if the photographing environment is different, it becomes possible to digitally convert the feature values of the power image accurately.

For example, let the two-dimensional function $P(x_i, y_j)$ ($x=1, 2, \ldots, k, j=1, 2, \ldots, l$) be the function of the power image. The mean value P of the power is given by the following Equation 5.

$$P = \frac{1}{kl}\sum_{i=1}^{k}\sum_{j=1}^{l} P(x_i, y_j) \qquad \text{[Equation 5]}$$

The dispersion value of the power $S_p^2$ can be calculated by the following Equation 6.

$$S_p^2 = \frac{1}{(kl-1)}\sum_{i=1}^{k}\sum_{j=1}^{l}[P(x_i, y_j) - P]^2 \qquad \text{[Equation 6]}$$

For example, suppose the central value and probability scale of the self-organization processing are calculated by applying the self-organization processing algorithm to the image information of the image (b) of FIG. 4, which is the power developed image. Based on the results of the self-organization processing, the central value of the self-organization processing, for example, is regarded as the gradation value of the power image having more than or equal to 70% of probability, and the probability scale is regarded as the dispersion value of the graduation of the power developed image having more than or equal to 70% of probability.

Further, rather than the central value of the self-organization processing, if pixels with gradation values belonging to within upper and lower range of the probability scale are extracted, it becomes possible to calculate a pixel set with the highest power such as the contour 402.

In such a case, the physical meaning of the probability scale (the dispersion value) of the gradation value of the power of image is the range configuring a set of pixels having more than or equal to 70% of probability, and is a parameter related to the degree of the image gradation density. As this parameter is not related to the size of the gradation value of the image information, it is characterized by being independent of the external conditions such as the lighting intensity of the reading environments where a raw image was taken. Preferably, the probability scale as a threshold value is the gathered power having more than or equal to 60-80%, and more preferably having a power having more than or equal to 70%.

After the self-organization processing of the area 402 of the power image 42, digitizing using the membership function is also possible. In the image $P'(x_i, y_j)$ ($i=1, 2, \ldots, h, j=1, 2, \ldots, g$) in the contour 402 of the power image 42 in FIG. 4, suppose that the solution of the membership function approaches the number 9 when the power of the image information of the region 402 is the highest, and that the solution of the membership function approaches the number 0 when the power of the image information of the region 402 is the lowest, the membership function of the power density can be defined as follows.

$$M_p = \frac{9}{(256^h)^g} \sum_{i=1}^{h} \sum_{j=1}^{g} P'(x_i, y_j) \quad \text{[Equation 7]}$$

In Equation 7, let $(256^h)^g$ be set as the highest numerical value of the image $P'(x_i, y_j)$. When the second item on the right side of Equation 7 becomes $(256^h)^g$, $M_p$ will become 9. When the second item on the right side of Equation 7 becomes smaller, $M_p$ approaches 0.

In Equation 7 described above, $M_p$ is an output having a numerical value between 0-9.

Further, it is also possible to formulate the characteristics of the area of the power image by the membership function. For example, by making the solution of the membership function approaches to the numerical value 9 as the area of the region 402 of the image (b) approaches the total area of the image (b) of FIG. 4, and making the solution of the membership function approaches 0 as the area becomes smaller than the total area, it will be possible to formulate the characteristics of the power area of the region 402 by the membership function. Using such a solution of the membership function of the power area, another feature value is given which could be used for the image coding.

Figure 5:
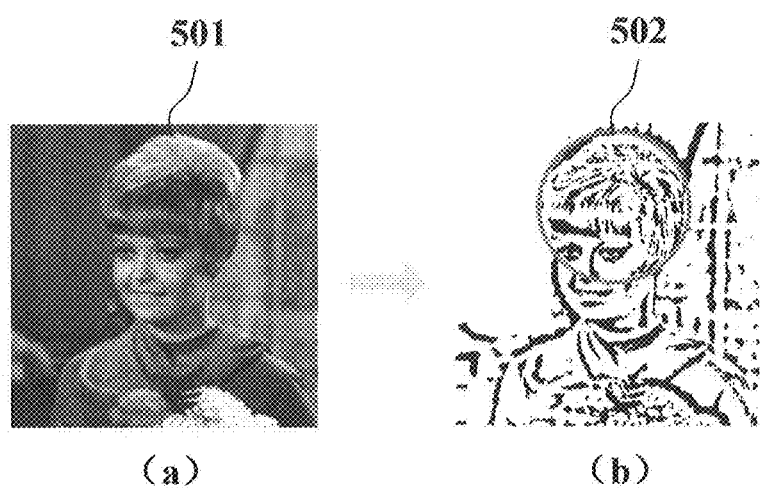
FIG. 5 shows one example of extraction of an image feature by conversion to a shape image.

FIG. 5 is a diagram explaining an example of extracting the feature of image information by converting a raw image into the shape image as a developed image.

A photo (a) in FIG. 5 shows the raw image for which the code conversion of the image is to be performed. A drawing (b) in FIG. 5 shows the contour image of the raw image. The contour image can be obtained, for example by performing differential processing of the raw image. In the raw image shown in the photo (a) in FIG. 5, it is also possible to calculate a circular portion 502 which is most proximate to the contour image of the round head with the self-organization processing by focusing on the corresponding portion to the round contour 501 of the head.

First, the length of a connecting line from one arbitral pixel to another arbitral pixel, and a center position of the connecting line are calculated in the region subject to the self-organization processing in the contour image of the drawing (b) in FIG. 5. The calculation is performed for all the pixels of the region subject to the self-organization processing of the image information of the contour image of the drawing (b) in FIG. 5.

A pair of pixels constituting the circular contour has the features that the length of the connecting line of the pixels of the circular contour becomes close to the diameter of the circle, and that the center position of the connecting lines are concentrated at one point. Also the angle of each connecting line is different. On the basis of the features of forming a circular line, the circle 502 which is most proximate to the head of the contour image as in the drawing (b) in FIG. 5 can be calculated by using the algorithm of the self-organization shown in FIG. 2.

More specifically, by using the algorithm of self-organization mentioned above, each pixel having similar length of the connecting line is extracted. Then, by using the feature that the center positions of the connecting lines of the pixels of the circular contour are concentrated at one point, it is possible to extract pixels of the circular contour by the calculation of the self-organization processing.

The formulation method of the membership function in a circular shape is similar to the one described above. The membership function may be created in a way that the value approaches 9 if each pixel of the contour image of the head section approaches the circle 502, and the value approaches 0 if each pixel becomes far from the circle 502. In this way, the calculation result 0-9 of the membership function of the shape can be one of the feature information which is to be converted into the image code.

Figure 6:
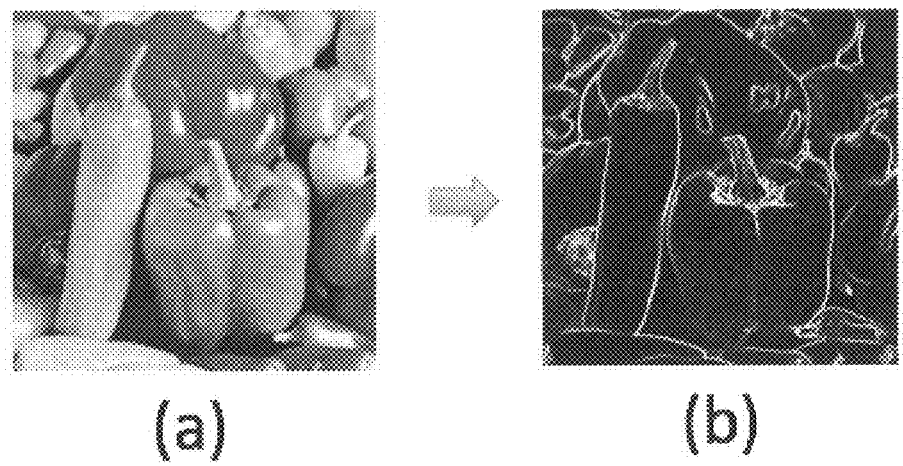
FIG. 6 shows one example of extraction of an image feature by conversion to an edge image.

FIG. 6 is an illustration of yet another developed image. A photo (a) in FIG. 6 shows a raw image and a drawing (b) in FIG. 6 illustrates an edge image which is a developed image of the raw image. The features of the image information can be extracted using this edge image with the self-organization processing.

The edge component that appears as a sharp change in the luminance of the pixels constituting the image is one of the important composition elements for extracting the specific features of an image. The edge image can be obtained by passing the raw image through a linear first-order space differential filter.

Even if the same photographic subject is used, the gradation value of each pixel in the edge image as the developed image of the drawing (b) in FIG. 6 has a different value due to the difference in brightness of the environments where the raw image was photographed, as explained in the case with the developed image of the photo (b) in FIG. 4. Therefore, the extraction of the feature information using the threshold value of the conventional Euclidean distance generates a different image code even for the same photographic subject. This is mainly because of the existence of differences in the photographing environments, which causes a problem in that the code conversion has lower stability.

In the edge image of the drawing (b) in FIG. 6, the distribution density of pixels having the gradation value of the edge section is high, and the density of the gradation value of the other pixels is low. Therefore, on the basis of the algorithm of the self-organization processing, it is preferable to calculate the threshold value (dispersion value) of the probability scale with a focus on the density in the edge image.

First, in the edge image of drawing (b) in FIG. 6, the pixels having the luminance larger than the threshold value of the probability scale are extracted.

Unlike the power image, the pixels in the edge image $E(x_i, y_j)$ j=1, 2, ... v, j=1, 2, ..., w), except for the pixels in the continuous edge linear section, are mostly scattered. Therefore, by setting all pixels having a value greater than the threshold value of the probability scale of the edge image to a set of edge pixels, the membership function of the edge pixels belonging to the set of edge pixels can be formulated.

Since there is a feature that the area of all pixels belonging to the set of edge pixels is much smaller than the area of the other pixels, it is also possible to formulate the feature based on the formulation process of the membership function of the power area.

Figure 7:
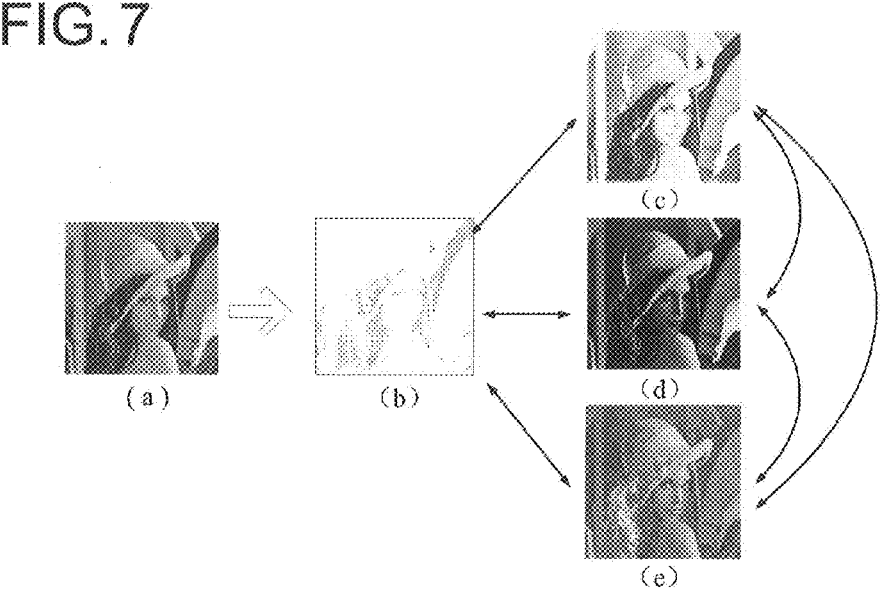
FIG. 7 shows one example of extraction of an image feature by conversion to a similar image.

FIG. 7 explains an example of generating a plurality of developed images where image features are extracted by the conversion of similar images.

In FIG. 7, a raw image (a) is divided into four versions (developed images) of C (cyan), M (magenta), Y (yellow), and K (black). FIG. 7 shows the K version image (b) developed to K, C version image (c) developed to C, M version image (d) developed to M, and the Y version image (e) developed to Y. By letting the K version image (b) and the C version image (c) be a pair, the K version image (b) and the M version image (d) be a pair, the K version image (b) and the Y version image (e) be a pair, the C version image (c) and the M version image (d) be a pair, the M version image (d) and the Y version image (e) be a pair, and the C version image (c) and the Y version image (e) be a pair, developed images can be converted from similar images with calculating the correlation coefficient between each pair.

For example, with the hamming distance for facilitations, the correlation between the multi-value image function $F(x_i, y_j)$ where the gradation represents the luminance of the K version (black) and the multi-value image function $C(x_i, y_j)$ (i=1, 2, ..., n, j=1, 2, ..., m) of the C version can be calculated as follows.

$$S_{KC} = 9 \left[ 1 - \frac{1}{(255)^{nm}} \sum_{i=1}^{n} \sum_{j=1}^{m} |K(x_i, y_j) - C(x_i, y_j)| \right] \quad \text{[Equation 8]}$$

To calculate the degree of similarity more accurately, the mean value of the hamming distance of the multi-value image functions $F(x_i, y_j)$ and $C(x_i, y_j)$ (i=1, 2, ..., h, j=1, 2, ..., g) can be calculated as follows.

$$A = \frac{1}{hg} \sum_{i=1}^{h} \sum_{j=1}^{g} |K(x_i, y_j) - C(x_i, y_j)| \quad \text{[Equation 9]}$$

In the same manner as described above, it is also possible to calculate the dispersion value of the hamming distance by the following equation.

$$S_{KC}^2 = \frac{1}{hg-1} \sum_{i=1}^{h} \sum_{j=1}^{g} [|K(x_i, y_j) - C(x_i, y_j)| - A]^2 \quad \text{[Equation 10]}$$

If the mean value of the Hamming distance of "Equation 9" is taken as the center value of the self-organization processing, and the dispersion value of the Hamming distance of "Equation 10" is taken as the probability scale of the self-organization, it will be possible to calculate the degree of similarity between the multi-value image functions $F(x_i, y_j)$ and $C(x_i, y_j)$ accurately, for example, with the probability of more than or equal to 70% by using the algorithm of the self-organization.

As shown in FIG. 7, by having color-separated outputs of the four C, M, Y and K images from one raw image, and then calculating the degree of similarity between the color images as described above using the images of each color, it is possible to convert developed images from six numbers of similarity images. Therefore, six characteristic numerical values digitized from the 6 numbers of developed images are configured as feature vectors of the image using the information extraction method described above.

In addition, in a plurality of geometric or physical developed images described above, it is possible to formulate the membership function using the probability scale for the self-organization processing, and describe fuzzy information of the characteristics of the developed image as the value of 0-9 or up to n.

<Generation of Image Code>

As above, using the developed images, the self-organization processing and formulated membership functions, quantification of the feature information as the value from 0 to n was described.

Based on the feature information calculated by the self-organization processing, a method of generating an image code will be explained below. As the method of generating an image code from a plurality of pieces of the feature information, it is possible to appropriately apply well known means commonly used in the art.

The conversion of a single raw image into a plurality of pieces of developed image information was already described above. As will be described further below, it is possible to generate a plurality of pieces of digital information from one piece of developed image information. For example, by dividing a developed image into several pieces, one can generate a plurality of pieces of digital information.

For example, in the case that one raw image generates 15 pieces of developed image information, and each piece of the developed information generates 4-bit digital information, an image code consisting of 60-bit in total can be generated.

Any appropriate multi-value data (for example, 2-valued, 8-valued, 10-valued, 16-valued or n-valued) can be optionally employed as an image code.

For example, one developed image is divided into a plurality of regions, and the self-organization processing using a probability scale is performed for each divided region. Then, the calculated numerical value of the feature information of each divided region obtained by the self-organization processing is compared. Depending on which side of the number is greater, digital conversion to 2-valued code data (bit) will be performed. Therefore, it is possible to generate a plurality of pieces of 2-bit data from one developed image. Further, by performing such a process for every developed image, it becomes possible to generate many more feature bits from a piece of raw image information, and improve the resolution for identifying an image.

By arranging these feature bits in a predetermined order, the image code for identifying the image is generated. Although the conversion to 2-value was described in the example above, it is not only limited to the 2-value, and the conversion may be performed into multi-values such as 3-valued and 4-value and the like.

In the case where the developed information is divided into a plurality of regions, the number of divisions and the dividing positions may be determined beforehand. The number of divisions and the positions where the division are performed can be optionally set based on the viewpoint that the image information is converted accurately into a unique image code.

Figure 8:
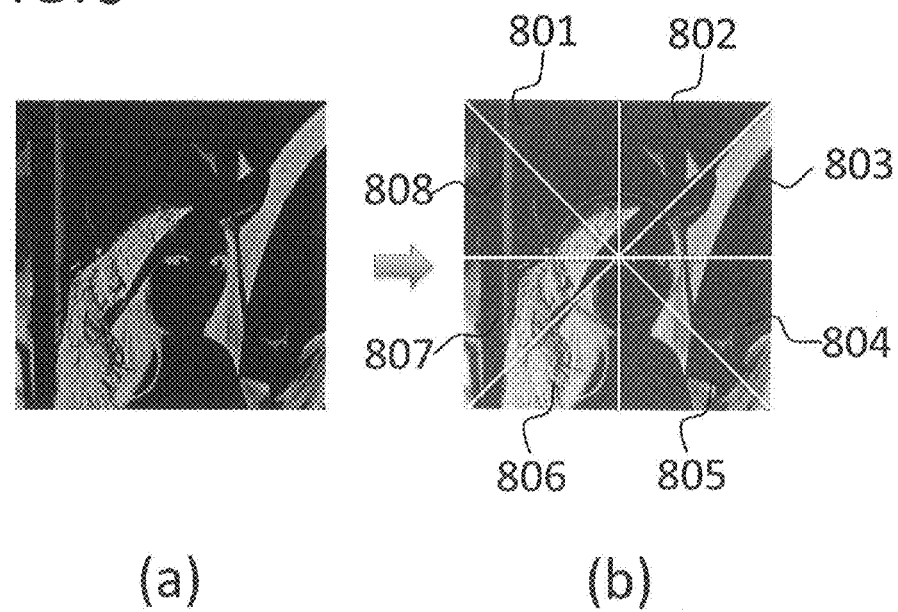
FIG. 8 shows one example of coding the image information by dividing a power image.

For example, as shown in FIG. 8, it is possible to divide the developed image by the lines passing through the center of the developed image. Further, a central region can be set in the middle of the image, and another region which surrounds the central region can be set so as to enclose the central region from the outside. In the manner that the next larger region encloses the previous region, the enclosure can be provided multiple times with changing the size of the region enclosing the previous region. Then, the self-organizing process can perform per surrounded region. Although it is possible to arbitrarily set as to how many divisions should be created, or how many stages of enclosures should be provided, the division in the range of about four to ten divisions is preferable.

A concrete example of a method for generating an image code by dividing a developed image is explained with reference to FIG. 8. FIG. 8 shows one example of converting image information into a code by dividing a power image as a developed image into eight divisions.

The following description will be given based on the premise that a product label has its frame, and the reading direction of the image by a camera is constant.

FIG. 8 shows the power image (a) of the product label and the divided image (b) in which the power image was divided into eight regions 801-808.

To start with, using a threshold value of a probability scale, the feature information of the power image is extracted by the self-organization processing.

Next, by letting two adjacent regions be a pair (for example, a pair of the regions of 801 and 802, and another pair of the regions of 803 and 804), four pairs are formed.

The number of pixels extracted by the self-organization processing of each region 801-808 is taken as $N_{a1} \sim N_{a8}$, respectively.

In the regions 801 and 802, "1" will be set if the number of pixels $N_{a1}$ is greater than $N_{a2}$ ($N_{a1} > N_{a2}$)

(conversely it may also be "0", the same can be applied to the comparisons of the other regions below), in the regions 803 and 804, "1" will be set if the number of pixels $N_{a3}$ is greater than $N_{a4}$ $N_{a3} > N_{a4}$), in the regions 805 and 806, "1" will be set if the number of pixels $N_{a5}$ is greater than $N_{a6}$ ($N_{a5} > N_{a6}$), and in the regions 807 and 808, "1" will be set if the number of pixels $N_{a7}$ is greater than $N_{a8}$ ($N_{a7} > N_{a8}$).

In this way, it is possible to extract the 4-bit digital code information from the eight divided regions of one developed image.

The following method is also effective. Based on the central value of the power, select all the pixels $P(x_i, y_j)$ (i=1, 2, ..., g, j=1, 2, ..., h) within the probability scale for each of the region 801-808 of the power image with the self-organizing processing. Let $V_{p1} \sim V_{p8}$ be the power value of each region of the power image $P_1(x_i, y_j) \sim P_8(x_i, y_j)$, respectively.

In the regions 801 and 802, "1" will be set if the power value $V_{p1}$ is greater than $V_{p2}$ ($V_{p1} > V_{p2}$)

(conversely it may also be "0", the same can be applied to the comparisons of the other regions below), in the regions 803 and 804, "1" will be set if the power value $V_{p3}$ is greater than $V_{p4}$ ($V_{p3} > V_{p4}$, in the regions 805 and 806, "1" will be set if the power value $V_{p5}$ is greater than $V_{p6}$ ($V_{p5} > V_{p6}$), and in the regions 807 and 808, "1" will be set if the power value $V_{p7}$ is greater than $V_{p8}$ ($V_{p7} > V_{p8}$).

This approach can also extract the 4-bit digital code information from the eight divided regions of one developed image.

Such a division processing can be performed, for example, on the R, G, B of raw image information which is to be the object for the image coding, or on color-separated developed images of C, M, Y, K, respectively. More than 18 types of developed images such as the power image, the differential image, the similarity image, the entropy image, and the frequency image etc can be converted.

Therefore, it becomes possible to generate an image code consisting of more than or equal to 72 bits with just using these 18 types of developed images.

As another image code conversion method, it is also possible to use a feature vector as an image code by converting a plurality of pieces of the feature information mentioned above into the feature vector of the image. As described above, it is possible to generate a feature vector by quantifying the features of each developed image into 0-9 or n as fuzzy information followed by aligning the quantified feature information corresponding to the plurality of the developed images. It is also possible to configure feature vector space beforehand by registering feature vectors created so as to correspond to each type of raw image in a server. In the process of the image code conversion, it is possible to compare a feature vector extracted from a raw image with a plurality of feature vectors registered in the server. Based on the results of the comparison, among a plurality of the feature vectors registered in the vector space, the feature vector having the closest Euclidean distance to the feature vector extracted from the raw image is set as the image code for the raw image. Accordingly, it is possible to convert the same images into the same image codes with better stability.

Concretely, let q be the number of raw images, and let feature vectors $V_{i1}, V_{i2}, \ldots, V_{ip}$ be the feature information of the quantified developed image of the (i)th raw image. The feature vector space for the q numbers of raw images registered in the server will be as follows.

$$V_{11}, V_{12}, \ldots, V_{1p}$$
$$V_{21}, V_{22}, \ldots, V_{2p}$$
$$\vdots$$
$$V_{q1}, V_{q2}, \ldots, V_{qp}$$

[Equation 11]

Let vectors $P_{i1}, P_{i2}, \ldots, P_{ip}$ be the feature vectors of the (i)th raw image which is the object for the code conversion of the image information. In this case, the Euclidean distance (Euclidean distance) from the feature vectors $P_{i1}, P_{i2}, \ldots, P_{ip}$ to each of the corresponding feature vectors in the feature vector space of the image registered in the server can be defined by the Equation 12 below.

$$E_i = \left( \sum_{j=1}^{P} (P_{ij} - V_{ij})^2 \right)^{\frac{1}{2}}$$

[Equation 12]

In the feature vectors of the image registered in the feature vector space, the feature vector of the image $V_{Ii} \sim V_{iP}$ corresponding to the smallest numerical value $E_i$ in the Euclidean distance $E_i$ (i=1, 2, ..., q) will be determined as the image code for the raw image. Thus, from the preliminarily registered feature vectors, by choosing the feature vector having the feature vector space which has the closest Euclidean distance as the image code for the image, it becomes possible to generate a more stable image code.

In order to convert an image into an image code still more accurately, the following method can be adopted.

First, by reading the same image multiple times (for example, 10 times) at the different reading environment having different brightness, angles and the like, a plurality of raw images (10 in this example) are acquired. Each of the plurality of raw images is then converted into a plurality of developed images, and feature information corresponding to each of the developed images is calculated and quantified by the self-organization processing. The quantified feature information is arranged to generate a plurality of feature vectors (10 in this example). The self-organizing processing based on a probability scale is further performed on the plurality of the feature vectors of the same image, and the central value and the probability scale per common element (quantified feature information) of the 10 feature vectors from the same image are calculated. Thus, based on the plurality of raw images of the same image acquired under different photographing environments, it is possible to calculate a feature vector with high accuracy by trial and error.

Regarding each of the plurality of images which are intended to be registered, by registering both the central value and the probability scale calculated from such a trial and error process as feature vectors in the server, it becomes possible to convert the image into the same image code with better stability even if the same raw image is photographed under a variety of environments with different brightness etc.

Here, the treatment of the distance of the probability scale of a feature vector will be explained.

Let $M_{ij}$ (j=1, 2, . . . , p) be each probability scale of the feature vectors of (i)th image registered in the server, and $C_{ij}$ (j=1, 2, . . . , p) be the central value of the feature vectors, and let $P_{i1}, P_{i2}, \ldots, P_{ip}$ be the central value of the feature vectors of the read raw image. If the absolute value of $(P_{ij}-C_{ij})$ is greater than the probability scale $M_{ij}$, the probability scale $M_{ij}$ is subtracted from the absolute value of $(P_{ij}-C_{ij})$. This value is the difference between the raw image vectors and the registered vectors. On the other hand, if the absolute value of $(P_{ij}-C_{ij})$ is less than the probability scale $M_{ij}$, since it is within the range of the probability scale, $(P_{ij}-C_{ij})$ is set to be 0 by assuming that the difference does not exist.

By such a process, based on Equation 12, the distance $E'_i$ (i=1, 2, . . . , q) of the probability scale can be calculated.

Among the probability scale distances $E''_i$ (i=1, 2, . . . , q), the feature vector for the image registered in the feature vector space corresponding to the smallest numerical value $minE''_i$ is determined as the image code for the corresponding raw image.

There are many types of methods such as geometrical or physical image conversion methods and the like for the extraction of the features of an image. There are also various membership function formulating methods for the converted images. In addition, the numerical value for representing the ambiguity relating to features of an image can be set as a numerical value greater than 0-9 or smaller than 0-9. Such various modified examples show the designs of the present invention, and are included within the scope of the present invention.

Figure 9:
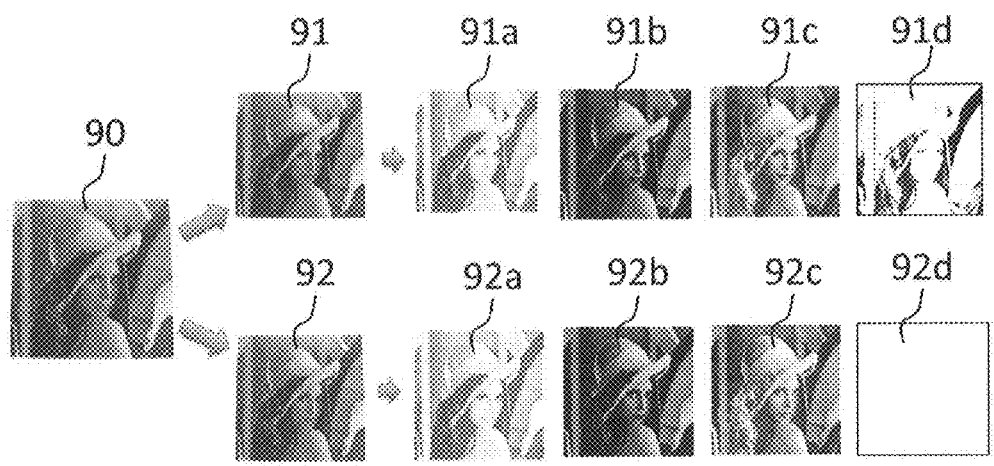
FIG. 9 illustrates the principle of adjusting the degree of the gradation between the images of a plurality of colors.

FIG. 9 illustrates the adjusting principle of the degree of the gradation between the images having a plurality of colors.

In FIG. 9, the image 90 shows the original image, and the image shows the image information (same as the original image) configured from the four colors of C, M, Y and K. Similarly, the image 92 can be converted to an image configured from 3 colors of C, M and Y (black color K is removed from the original image.)

The image 91a is considered as the C version image of the image 91, the image 91b is considered as the M version image of the image 91, the image 91c is considered as the Y version image of the image 91, and the image 91d is considered as the K version image of the image 91.

The present invention also provides an anti-counterfeit technology for printed images. In image 91 of FIG. 9, K version color is set as 0, and in image 92, the K version color is expressed as the mixture of 3 colors of C, M, and Y.

The image 92a is considered as the C version image of the image 92, the image 92b is considered as the M version image of the image 92, the image 92c is considered as the Y version image of the image 92, and the image 92d is considered as the K version image of the image 92 (since K is 0 in the image 92, nothing will appear in the image 92d.)

Not only it is possible to convert the image having K color to the image configured from the three colors of C, M, and Y, it is also possible, without showing the difference of the image quality from the original image, to adjust the image so as to have different image information from the original image. This technology implies that image information which seems identical can actually have the different image information consisting of complex combinations of the gradation of different pixels, and thus the technology is useful for preventing counterfeiting of product labels.

Figure 10:
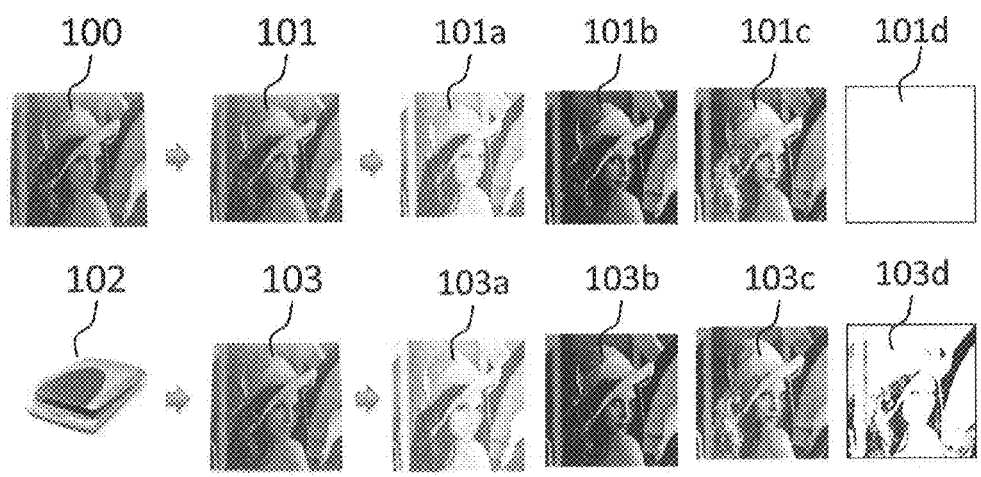
FIG. 10 shows the configuration principle of an image which makes counterfeiting difficult by color adjustments.

FIG. 10 shows the configuration principle of an image for which the counterfeiting is difficult.

In this figure, 100 is the original image, and 101 is the image obtained by converting the original image 100 with only three colors of C, M, and Y. That is, in the image 101, the gradation of all the pixels of the color K is 0. The image 101a is considered as the C version image of the image 101, image 101b is considered as the M version image of the image 101, the image 101c is considered as the Y version image of the image 101, and the image 101d is considered as the K version image of the image 101.

When the image 101 in FIG. 10 is read using a scanner 102, the scanned image 103 is obtained.

Here, the important point to note is the difference between the image 101 having three colors of C, M, and Y and the scanned image 103. This image difference is that the K version image 103d of the scanned image 103 is different from the K version image 101d of the original image 101 which has three colors of C, M, and Y.

In general, a scanner is often used in the process of counterfeiting. Even when the image 101 without the K color is scanned, an image 103 having the K color is obtained. Therefore, by creating a product label and the like as the image 101 constituted from C, M, and Y, and by judging how the K color will appear at the time of reading the image, it is possible to judge whether the product is a fake one or not.

Not only just depending on the changes of the K color, it is also possible to judge the fake product by adjusting, without changing the image quality from the original image, the degree of the gradation between the pixels of each color, and configuring the image so that the gradation of any color of the C, M, Y, and K will show the difference when the image is scanned. All these are included within the scope of the present invention.

As is apparent from the above description, according to the present invention, it is possible to provide a printed image that can be converted into a unique image code and that can be used for product labels or packaging due to its difficulty to counterfeit.

Figure 11:
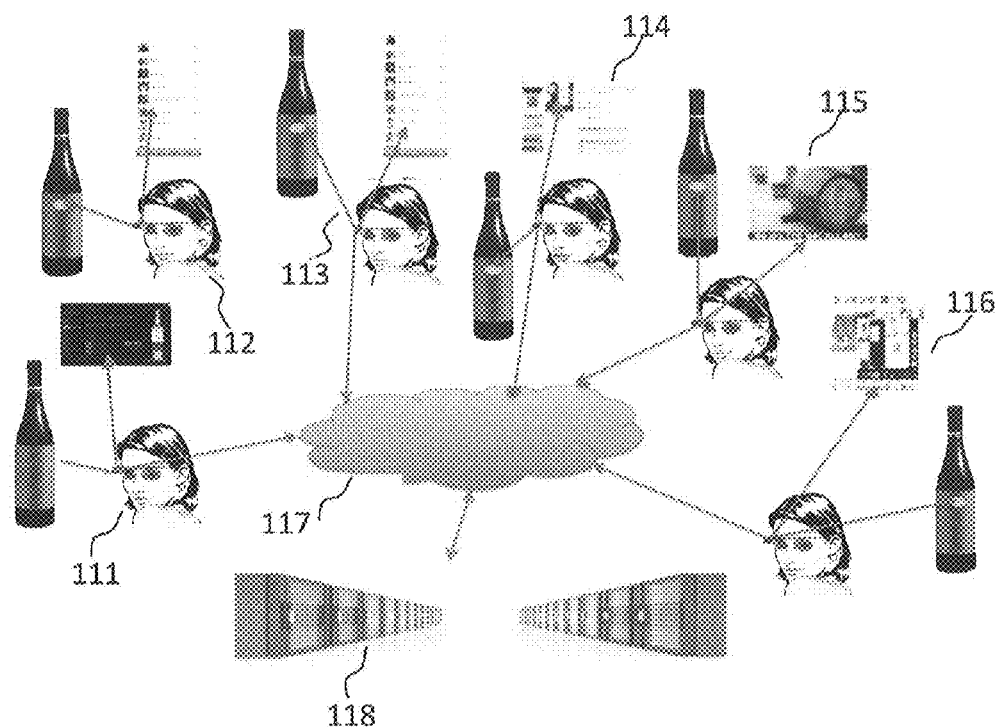

FIG. 11 is a diagram illustrating how, by putting a printed material such as product labels on products, it is possible to build a social network system centered on the product.

As shown in FIG. 11, by incorporating the code conversion device of image information according to the present invention in Google Glass, cell-phones and other mobile terminals, it is possible to run a new type of website through the mobile terminal devices, a network 117, and a server 118.

For example, using a camera of the terminal device, the image of a product label attached to the product is read, and the raw image of the product label is converted into an image code. Based on the converted image code, the terminal device can download the product information corresponding to the product from the server 118 via the network 117, and display the product information on the screen of the terminal device. If the information related to the product, such as moving images and the like is stored in the server, the product label works as a medium linking to the product advertising, and it becomes possible to build new Internet broadcasting media.

In FIG. 11, reference numerals 111 and 112 represent an image in which an image of a product label is converted into an image code, and a new social network will be created for those who have an experience of accessing the product. That is, by using access history of the product, it is possible to provide virtual space which works as an opportunity to communicate directly or indirectly for people who have interest in the same product.

In FIG. 11, reference numeral 113 illustrates the construction of a new Internet retailing system in which a product label works as the link to the purchase of the product. In this system, the product label image is converted into an image code using a mobile terminal and the like. The detailed information about the product is then obtained and the product can be purchased via the network by the image code.

In FIG. 11, reference numerals 114 and 115 show the image of a system. In the system, by just reading the image of a product label before purchasing the product, consumers can obtain the correct information such as the product origin information, the product history, and sales area information and the like. It is also possible to make a video of such information.

To make a mechanism where consumers can always arrive at the correct product information, an accurate image code conversion function including the capability of judging authenticity of the image is required. If this can be realized, a product label can work as a new contact of business for customers.

In FIG. 11, reference numeral 116 shows the image of a system. This system can guide a person to a desired home page by estimating the interests and the like of the person based on the conversion history of various product labels, the information collecting history, and the browsing time and the like. Thus, since it is possible to gather various types of information on a site basis, the collected information can used in various types of new businesses.

As described with several examples in FIG. 11, according to the code conversion device for image information of the present invention, the image information of product labels and the like can work as a wide variety of functions such as the function of guiding a customer to the entrance on the Internet, the function as the address of the home page, the function as a medium of advertising a product, and the function of attracting customers of social networks and the like.

Figure 12:
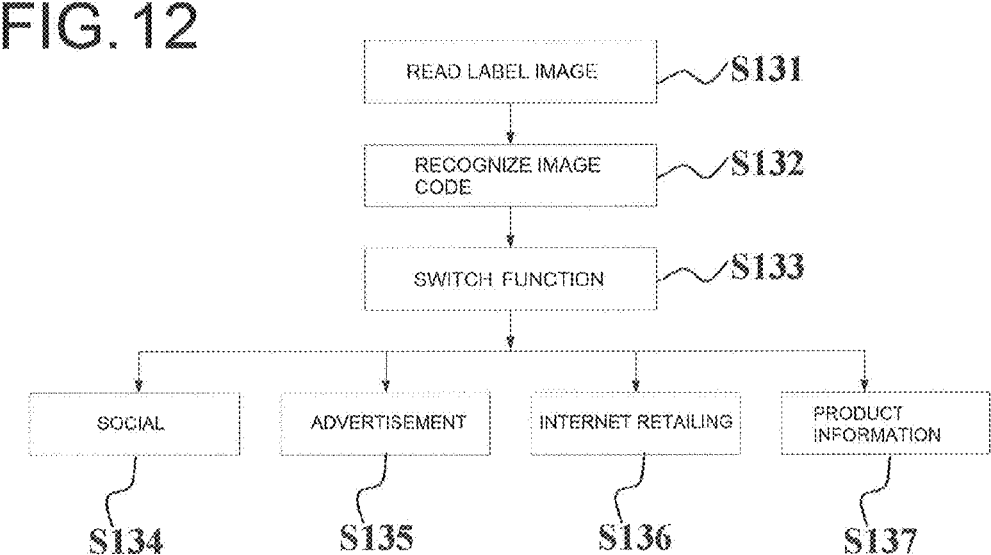

FIG. 12 shows a flow diagram of a system for providing related information of an image. In this system, by putting a label not only on products, but also on other "items" that include facilities, equipments, and display items and the like, a wide variety of information mainly focusing on such "items" is provided.

As shown in FIG. 12, the process of the system providing a wide variety of information mainly focusing on such "items" consists of the following steps.

In the first step, the image information of a label attached on an item is read with the help of a mobile terminal or the like (S131).

In the next step, the read image information is converted into an image code (S132). Among images having each color of R, G, and B or C, M, Y and K, at least one color image is digitized into 0 to n with a plurality of geometrical or physical image conversions in the process of coding the image.

Then, depending on which type of the functions is to be provided, the function is switched (S133). For example, unlike conventional smart phones, as there is no operating key or button switch in small mobile terminals such as Google Glass or the like, other operation input means becomes necessary. As such input means, for example, by recognizing the speed or the direction of the movement of humans' eye, the interval and the frequency of eyelids and the like, it becomes possible to switch the function by the movements of the eyes and eyelids. Further, it is also possible to mount a gyro function in Google Glass, and recognize the acceleration of the movement of the head as function information so as to switch the functions. Further, by sensing the sound caused by the motion of clenching one's teeth of human beings, or the movement of the cheek bone, the functions of Google Glass may be switched.

When a function is selected, depending on the selected function, processes such as the processing of the social network (S134), the processing of product advertising (S135), the processing of the Internet retailing of products (S136), and the processing of the Internet broadcasting of related information of products (S137) are provided.

The function switching process described above may be executed before a label is read, or before an image code conversion is performed.

As already described above, one of the most important issues during the code conversion from image information is that performing a stable code conversion is difficult because the distribution of the gradation values of the read image greatly vary due to environmental differences where the image is read (particularly, the difference of brightness or the direction of light). In the present invention, an image that is the object for image coding is firstly converted into a plurality of developed images by using geometric or physical model. Thereupon, using the probability scale as reference, feature information of the image is extracted from a plurality of the developed images, and then the feature information is quantified. With this, the present invention made it possible to stably generate the same image code from the same image.

Figure 13:
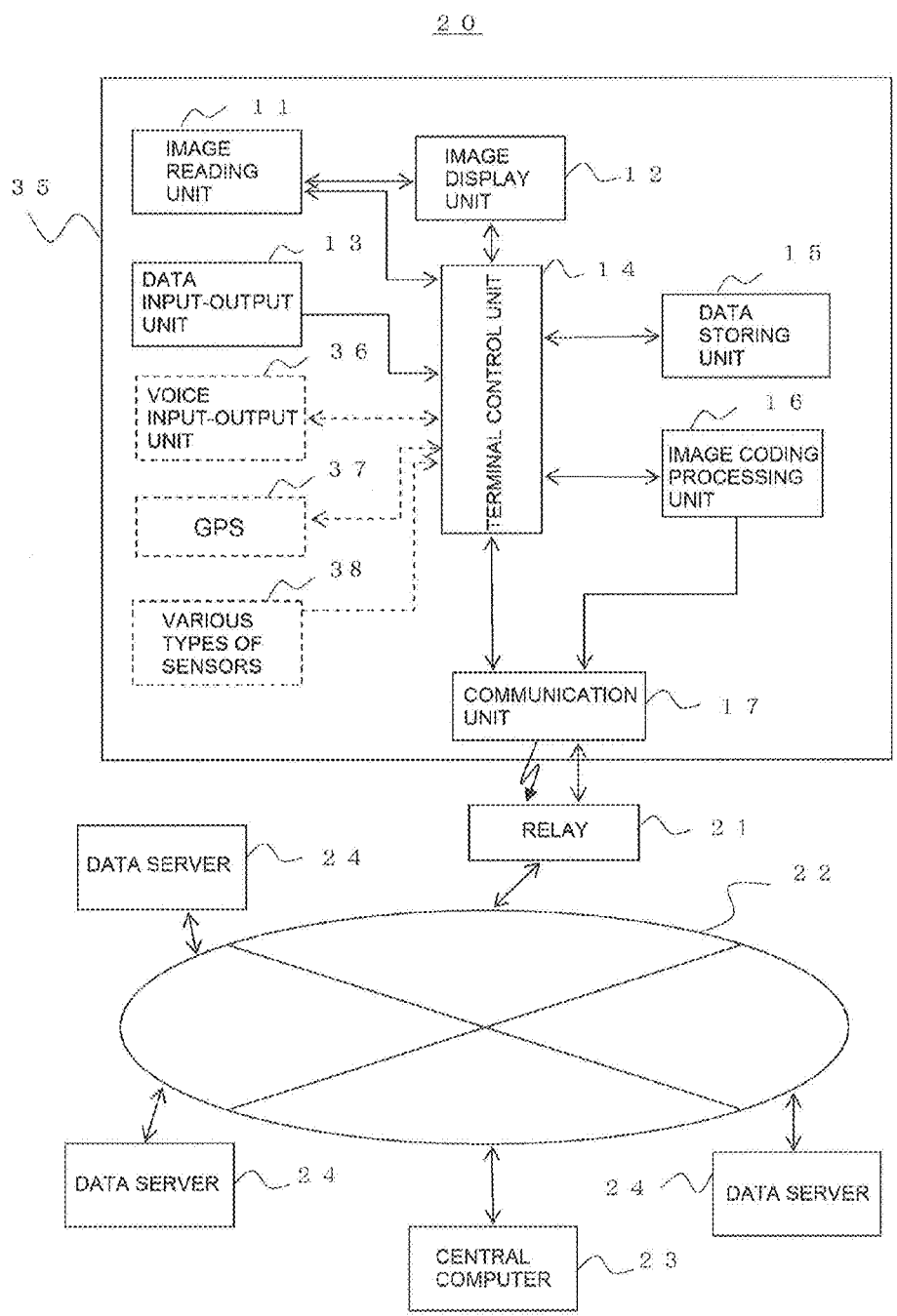
FIG. 13 is a functional block diagram illustrating one example of a system providing related information of an image of the present invention.

FIG. 13 is a functional block diagram of an image retrieval system 20 according to one embodiment of the present invention.

Regarding a terminal device 35 of FIG. 13, the sections having a function similar to that of the mobile terminal device 10, shown in the block diagram of FIG. 1B, same reference numerals as those shown in FIG. 1B are used. However, as the section corresponding to various types of sensors 18 shown in FIG. 1B, a voice input-output unit 36 and GPS 37 are shown. Also, in order to show the possibility of providing various other types of sensors as necessary, various types of sensors 38 are illustrated. It is also possible to provide functions such as voice guidance and a faction of playing music and the like in the voice input-output unit 36. In addition, by mounting a GPS, it becomes also possible to obtain information such as map information guidance, and the location of the terminal and the like.

The terminal device 35 has similar functions as those of the mobile terminal device 10 from FIG. 1B. The image reading unit 11 displays the raw image, which was obtained by reading the image, as it is on the image display unit 12. When coding of the image is performed, by the instruction of the terminal control unit 15, the read image is forwarded to the image coding processing unit 16.

The image coding processing unit 16 is provided with an image conversion unit 25, a feature extraction unit 26, and an image code generation unit 27 (see FIG. 1B). The image coding processing unit 16 generates a plurality of pieces of developed image information from the raw image information, and generates a unique code peculiar to the image that was acquired with the image reading device.

In this way, the image conversion unit 25 of the image coding processing unit 16 converts the raw image information of the image which is the object for image coding into the developed image information including the power image, the edge image, the shape image, the similar image, the entropy image, and the frequency image, etc. by mapping, for example, images having different colors such as the monochrome, or R, G, B, or C, M, Y, K of the raw image information into the power space, the shape space, the edge space, the similar space, the entropy space, and the frequency space and the like, respectively.

The control information and the image code transmitted from the communication unit 17 are forwarded, via a relay 21, to a central computer 23 through a network 22. In the central computer 23, on the basis of the control information from the terminal device 35, a search for related information is performed based on the image code. The information associated with the image is retrieved, and then the related information is forwarded to the terminal device 35. Instead of sending the image code from the terminal device 350 to the central computer 23, the terminal device 35 can also be configured to obtain the image related information by directly accessing the data server 24 based on the image code values.

As already explained above, by converting each of the different color images of the raw image into a plurality of spatial mappings, at least 18 pieces of developed image information can be easily obtained. In addition, it is also possible to extract a plurality of pieces of feature data from a single developed image. Suppose, for example, that raw image information is converted into 18 pieces of developed image information, and then the feature data of 4 bits is extracted from each raw image data, it will be possible to generate an image code of 9 bytes (64 bits). For example, with an image code of 64 bits, it will be possible to identify more than or equal to about 1844 images.

If the number of developed images is increased, the range (capacity) that can be identified with an image code increases, and there is an advantage that the accuracy of the image code can be enhanced. However, there will cause a problem that calculating the self-organization processing and the like takes too much time, and thus it will take time for the code conversion process. Therefore, the number of developed images required for generating the image code can be decided by taking into account the balance of the size of the image code needed for the practical use and the calculation speed required for the image code conversion.

As shown in Table 1, with the code conversion technology (referred as ITC technology) of image information according to the present invention, it is possible to significantly reduce the data for identifying an image compared to the conventional AR technology. Therefore, it becomes possible to retrieve the image-related data at high speed. It also becomes possible to significantly reduce the communication load and the database volume.

TABLE 1

|  | Required capacity | Anti-counter-feiting feature | Resolution efficiency | For large amount of image | Processing efficiency |
|---|---|---|---|---|---|
| AR technology | A few Mbytes | None | Low | Complex | Low |
| ITC technology | A few 10s of bytes | Yes | High | Simple | High |

As shown in Table 1, the conventional AR technology needs a few Mbytes as necessary data for recording the feature information of one piece of image data. Meanwhile, the capacity required for image code of the present invention, as described above, is only 9 byte to several tens of bytes.

As mentioned above, in the present invention, by converting a raw image into various kinds of developed images, and further dividing each developed image into a plurality of images, it becomes possible to convert the raw image information into an image code having tens of bytes.

The image code generation unit 27 can use a plurality of previously formulated membership functions and quantify the feature information of more than or equal to 18 types of developed images as the information of 0 to n. For example, it is also possible to directly generate an image code with more than or equal to 18 digits in decimal number.

Further, by taking the quantified feature information of each developed image of the raw image as a plurality of feature vectors of the raw image followed by registering the vectors in the server, it becomes possible to configure the feature vector space of the image such as in "Equation 12."

In FIG. 13, the connection between the terminal device 35 and the network is not limited to the wireless communication. It is also possible to connect the terminal device 35 to a relay 21 using a wire.

In the example of FIG. 13, although the image coding processing unit 16 is disposed in the terminal device 35, it is also possible to provide the image coding processing unit 16 outside of the terminal device 35 such as in the relay 21 or the central computer 23 and the like. However, in this case, it is necessary to send the image information in the communications until an image code is generated. Thus, the communication load, until the code conversion is done will increase.

By the present invention, the feature information of the human body, such as a human face can be converted into an image code, and the image code can be registered. Thus, it is possible to do some shopping without using credit cards but using a face as if it were a credit card.

Further, in a similar manner, by converting the feature information of a human body such as a human face into an image code, and registering the code, it becomes possible to configure automatic ticket gates or various types of entry/exit gates as a system where cards are not needed.

INDUSTRIAL APPLICABILITY

By applying the means of the image coding to conventional product labels, all the product labels can be registered via the Internet. By using the product labels as the entrance to the Internet, customers can obtain product information such as the origin of the product, information on how to buy the product, and information on how to use the product, or the advertisement of the product, the social network information of the parties related to the product, or the Internet retailing information of the product and the like with reading the label of the product with a smartphone or Google Glass. Also it becomes possible to judge the authenticity of the product.

EXPLANATION OF REFERENCE NUMERALS

5: Product
6: Image of product label
10: Mobile terminal device
16: Image coding processing unit
20: Image retrieval system
25: Image conversion unit
26: Feature extraction unit
27: Image code generation unit
35: Terminal device
90, 100: Raw image
91, 103: C, M, Y, K image
92, 101: C, M, Y image 401: place having the highest power for the power image
402: Contour of the power image
501: Round head position of a human photo
502: Calculation result of the self-organization

The invention claimed is:

1. A code conversion device for image information for generating an image code which is unique to the image information from the image information, the code conversion device for image information comprising:
 a processor and a memory, wherein the memory contains instructions for causing the processor to perform operations of:
 converting acquired raw image information into a plurality of pieces of developed image information;
 extracting each piece of feature information from each of the plurality of pieces of developed image information by performing a self-organization processing using a probability scale on each of the plurality of pieces of developed image information; and
 quantifying a plurality of pieces of feature information and generating an image code.

2. The code conversion device for image information according to claim 1, wherein the processor converts a distribution of gradation of each pixel of the raw image information into the developed image information based on geometrical or physical factors.

3. The code conversion device for image information according to claim 2, wherein the developed image information converted by the processor includes at least one of:
 developed image information for each color where a gradation value of each pixel constituting the raw image information is resolved into a gradation value of a pixel of each color of RGB or CMYK,
 power developed image information where the gradation value of each pixel is squared to convert into a physical power value,
 edge developed image information obtained by gathering pixels of high gradation values where gradation values of adjacent pixels sharply change, or
 developed image information indicating degree of similarity where difference between gradation values of corresponding pixels in the developed image information for each color is calculated, and the difference is used as the gradation value of the pixel.

4. The code conversion device for image information according to claim 1, wherein the processor treats the probability scale of the self-organization processing as a parameter having probability attributes of probability distribution containing at least one of normal distribution, multivariate normal distribution, exponential distribution, Erlang distribution, Weibull distribution, triangular distribution, and beta distribution, and sets a central value of the self-organization processing as a mean or an expected value of the probability distribution.

5. The code conversion device for image information according to claim 1, wherein the processor divides each of the plurality of pieces of developed image information into a plurality of regions performs the self-organization processing for each of the divided regions using the probability scale so as to extract the feature information for each of the divided regions, quantifies the feature information of the divided regions, compares the quantified feature information with the quantified feature information of another divided regions, and generates the image code based on the magnitude of the comparison.

6. The code conversion device for image information according to claim 1, wherein the processor performs the self-organization processing according to following equations:

$$A(n)=A(G(n))$$

$$M(n)=M[G(n),A(G(n))]$$

$$G(n)=G\{A(G(n-1)),M[G(n-1),A(G(n-1))]\}$$

where $A(G)$ is a central value of a set $G \ni (i=1, 2, \ldots, m)$ of a numerical sequence $p1, p2, \ldots, pm$ of a given probability distribution,
$M[G, A(G)]$ is the probability scale of the central value $A(G)$, and
$G(n) \ni p(n)i$ ($i=1, 2, \ldots, k$) is a set of numerical sequence $p(n)1, p(n)2, p(n)k$ of the probability distribution of the k items existing within a radius $M[G(n-1), A(G(n-1))]$ of a central value $A(G(n-1))$ calculated by an $(n-1)$th self-organization processing.

7. The code conversion device for image information according to claim 1, wherein the processor extracts the feature information of the developed image information from each of the plurality of pieces of developed image information by using a probability scale of a self-organization, uses a pre-formulated membership function for the feature information of each developed image information so as to quantify the feature information as information of a numerical value from 0 up to n, and generates the image code based on the numerical value.

8. The code conversion device for image information according to claim 1, wherein the processor generates feature vectors of raw image with the plurality of pieces of the quantified feature information corresponding to the extracted plurality of pieces of developed image information, stores a plurality of the feature vectors with respect to each image as an image code of the raw image, generates the feature vector of the raw image, which is the object of the code conversion, from the extracted plurality of pieces of the quantified feature information at a time of the code conversion from the raw image information, compares the generated feature vector of the raw image with registered feature vectors, and sets the feature vector with the closest Euclidean distance among the registered feature vectors as the image code of the raw image which is the object of the code conversion.

9. The code conversion device for image information according to claim 8, wherein the processor, at a time of registering the feature vectors:
 converts each of a plurality of pieces of raw image information of the same raw image, which are obtained by photographing the same image multiple times under different photographing conditions, into each piece of developed image information,
 extracts each piece of feature information from the plurality of the developed images,
 generates a plurality of feature vectors for the same image,
 performs the self-organizing processing, based on a predetermined probability scale, on the plurality of the feature vectors for the same image,
 calculates a central value and a probability scale of each piece of the feature information of the feature vectors,
 registers the central value and the probability scale of the plurality of the feature information as an image code including the feature vector,
 compares the central value of the feature information vector extracted from the raw image, which is the object of code conversion, with the central values of the registered feature vectors, and sets the feature vector having the central value with the closest distance of the probability scale as the image code of the raw image information that is the object of the code conversion.

10. A code conversion method for image information for generating an image code which is unique to the image information from the image information, the code conversion method comprising:
   an image conversion step for converting acquired raw image information into a plurality of pieces of developed image information;
   a feature extraction step for quantifying and extracting feature information from each of the plurality of pieces of developed image information by performing a self-organization processing using a probability scale on each of the plurality of pieces of developed image information; and
   an image code generation step for generating an image code including a digital code based on the plurality of pieces of quantified feature information extracted by the feature extraction step.

11. The code conversion method for image information according to claim 10, wherein the image conversion step includes any of the following:
   a conversion into developed image information for each color where a gradation value of each pixel of the raw image information is resolved into a gradation value of a pixel of each color of RGB or CMYK,
   a conversion into power developed image information where the gradation value of each pixel is squared to convert into a physical power value,
   a conversion into edge developed image information obtained by gathering pixels of high gradation values where gradation values of adjacent pixels sharply change, or
   a conversion into developed image information indicating degree of similarity where difference between gradation values of corresponding pixels in the developed image information for each color is calculated, and the difference is used as the gradation value of the pixel.

12. The code conversion method for image information according to claim 10, wherein the feature extraction step:
   treats the probability scale of the self-organization as a parameter having probability attributes of probability distribution containing at least one of normal distribution, multivariate normal distribution, exponential distribution, Erlang distribution, Weibull distribution, triangular distribution, and beta distribution, and
   sets a central value of the self-organization processing as a mean or an expected value of the probability distribution.

13. The code conversion method for image information according to claim 10, wherein the feature extraction step divides each of the plurality of pieces of the developed image information into a plurality of regions and performs the self-organization processing for each of the divided regions using the probability scale so as to extract the feature information for each of the divided regions, and
   wherein the image code generation step, using one of the divided regions as a reference region, quantifies the feature information of the reference region, compares the quantified feature information with the quantified feature information of the other divided regions, and generates the image code.

14. The code conversion method for image information according to claim 10, wherein the feature extraction step extracts the feature information of the developed image from each piece of the developed image information by using a probability scale of a self-organization, and
   wherein the image code generation step uses a plurality of pre-formulated membership functions for feature information of all the developed images so as to quantify the feature information as information of a numerical value from 0 up to n, and directly generates the image code.

15. The code conversion method for image information according to claim 10, the code conversion method further comprising a feature vector registering step for quantifying, with regard to a predetermined image, the feature information which is extracted in the feature extraction step and is extracted from the plurality of the developed image information, generating a feature vector for each predetermined raw image, and preliminarily registering the feature vector as an image code of the predetermined raw image in a feature vector registering unit,
   wherein the image code generation step further comprises the steps for:
   quantifying a plurality of pieces of the feature information extracted in the feature extraction step,
   generating the feature vector of the raw image, which is the object of the code conversion, from the quantified feature information,
   comparing the generated feature vector with the feature vectors registered in the registering unit, and
   judging the feature vector with the closest Euclidean distance among the registered feature vectors as the image code of the raw image which is the object of the code conversion.

16. The code conversion method for image information according to claim 15, wherein the feature vector registering step further comprises the steps for:
   converting each of a plurality of pieces of raw image information of the same raw image, which are obtained by photographing the same image multiple times under different photographing conditions, into each piece of developed image information, extracting each piece of feature information from the plurality of the developed images, and generating a plurality of feature vectors for the same image,
   a step for performing the self-organizing processing, based on a predetermined probability scale, on the plurality of the feature vectors of the same image,
   calculating a central value and a probability scale of each piece of the feature information of the feature vectors, and
   registering the central value and the probability scale of the plurality of the feature information as an image code including the feature vector, and
   wherein the image code generation step further comprises the steps for:
   comparing the central value of the feature information vector extracted from the raw image, which is the object of code conversion, with the central values of the registered feature vectors, and
   judging the central value of the feature vector with the closest distance of the probability scale as the image code of the raw image information that is the object of the code conversion.

17. A system for providing image related information using an image code, the system comprising a data terminal device connectable to a network and a server storing a plurality of pieces of related information related to an image,
   wherein the terminal device comprises the code conversion device for image information according to claim 1, an image reading unit, an image display unit, a data storage unit, a communication unit, a data input-output unit and a control unit for controlling various units, wherein the server stores the plurality of pieces of related information related to the image associated with the image code that is converted by the conversion device for the image information, and wherein the server transmits the related information corresponding to the image code, in response to a request from the terminal device, to the terminal device which made the request.

18. A non-transitory computer readable medium including a code conversion program for image information for converting image information into a unique image code, the readable medium executing:

an image conversion step for converting acquired raw image information into a plurality of pieces of developed image information;

a feature extraction step for extracting feature information from each of the plurality of pieces of developed image information by performing a self-organization processing using a probability scale on each of the plurality of pieces of developed image information; and an image code generation step for quantifying the feature information extracted in the feature extraction step and generating an image code including a digital code based on the plurality of pieces of quantified feature information.

* * * * *